US009589275B2

(12) United States Patent
Tang et al.

(10) Patent No.: US 9,589,275 B2
(45) Date of Patent: Mar. 7, 2017

(54) USER BEHAVIOR ANALYSIS METHOD, AND RELATED DEVICE AND METHOD

(71) Applicant: Huawei Technologies Co., Ltd., Shenzhen, Guangdong (CN)

(72) Inventors: Dong Tang, Hangzhou (CN); Hongding Zhang, Guangzhou (CN); Wei Zhou, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 55 days.

(21) Appl. No.: 14/524,530

(22) Filed: Oct. 27, 2014

(65) Prior Publication Data

US 2015/0066589 A1 Mar. 5, 2015

Related U.S. Application Data

(63) Continuation of application No. PCT/CN2012/085046, filed on Nov. 22, 2012.

(30) Foreign Application Priority Data

Apr. 28, 2012 (CN) .......................... 2012 1 0132715

(51) Int. Cl.
*G06F 17/30* (2006.01)
*G06Q 30/02* (2012.01)
*H04L 29/08* (2006.01)

(52) U.S. Cl.
CPC ......... *G06Q 30/0201* (2013.01); *H04L 67/10* (2013.01); *H04L 67/22* (2013.01); *G06Q 30/0251* (2013.01)

(58) Field of Classification Search
CPC ...................... G06F 17/30864; G06Q 30/0201
See application file for complete search history.

(56) References Cited

U.S. PATENT DOCUMENTS 8,577,842 B1 * 11/2013 Nagargadde et al. ........ 707/639
8,826,426 B1 * 9/2014 Dubey ............................ 726/22
(Continued)

FOREIGN PATENT DOCUMENTS

CN 101105795 A 1/2008
CN 101901245 A 12/2010
(Continued)

*Primary Examiner* — Alicia Willoughby
(74) *Attorney, Agent, or Firm* — Leydig, Voit & Mayer, Ltd.

(57) ABSTRACT

A user behavior analysis (UBA) method, and a related device and system are provided. The method is applied to a UBA system including at least one UBA cloud server. The method includes: receiving, by a UBA cloud server, a network content identifier reported by a first UBA subnode, where the network content identifier cannot be identified by the first UBA subnode; acquiring network content corresponding to the network content identifier; extracting a keyword from the network content; updating a behavior knowledge base by using the extracted keyword; and delivering, by the UBA cloud server, the updated behavior knowledge base or updated content of the behavior knowledge base to a UBA subnode set, where the UBA subnode set at least includes the first UBA subnode and a second UBA subnode. The UBA cloud server and the UBA subnodes are associated with a telecommunication network.

18 Claims, 14 Drawing Sheets

(56) References Cited

U.S. PATENT DOCUMENTS

| | | | |
|---|---|---|---|
| 2002/0143932 A1* | 10/2002 | Quintero et al. | 709/224 |
| 2003/0225763 A1* | 12/2003 | Guilak et al. | 707/7 |
| 2005/0149507 A1* | 7/2005 | Nye | 707/3 |
| 2006/0036966 A1* | 2/2006 | Yevdayev | 715/779 |
| 2008/0016059 A1 | 1/2008 | Henkin et al. | |
| 2011/0015996 A1 | 1/2011 | Kassoway et al. | |
| 2011/0082850 A1* | 4/2011 | Ball et al. | 707/706 |
| 2011/0161260 A1* | 6/2011 | Burges et al. | 706/12 |
| 2012/0173341 A1* | 7/2012 | Li | 705/14.66 |
| 2012/0323881 A1* | 12/2012 | Liu et al. | 707/709 |
| 2013/0275346 A1* | 10/2013 | Srikanteswara et al. | 706/12 |

FOREIGN PATENT DOCUMENTS

| | | |
|---|---|---|
| CN | 102185927 A | 9/2011 |
| CN | 102307315 A | 1/2012 |
| CN | 102685224 A | 9/2012 |
| WO | WO 0127760 A2 | 4/2001 |

\* cited by examiner

USER BEHAVIOR ANALYSIS METHOD, AND RELATED DEVICE AND METHOD

CROSS-REFERENCE TO RELATED APPLICATIONS

This application is a continuation of International Patent Application No. PCT/CN2012/085046, filed on Nov. 22, 2012, which claims priority to Chinese Patent Application No. 201210132715.3, filed on Apr. 28, 2012, both of which are hereby incorporated by reference in their entireties.

TECHNICAL FIELD

The present application relates to communication technologies, and in particular, to a user behavior analysis method, and a related device and system.

BACKGROUND

With the progress of all-Internet Protocol (IP) networks, a wealth of services bring both opportunities and challenges to an operator. Service traffic grows explosively. To better run a network and provide users with better experience, it is needed to analyze Internet users' access behavior, and thereby learn users' interests, network-wide application statuses and application trends, and so on, so as to better provide personalized services for the users and optimize the network.

User behavior analysis (UBA) can be used not only for fine operation planning and network planning, but also for services such as precise advertisement push, and an operator may accordingly run high-value value-added services (such as an advertisement pushing service). According to statistics, turnover of international Internet advertising in 2007 is 44 billion U.S. dollars (with a growth rate exceeding 44% for three consecutive years), where China accounts for 10.3 billion Chinese Yuan, and it is expected to reach 70.3 billion Chinese Yuan in 2012.

Common existing architectures for UBA device deployment are shown in FIGS. 1A and 1B, where different UBA devices may be deployed in different areas. A UBA device needs to analyze content accessed by users. Generally, daily amount of user-accessed content is huge, and the amount of contents added to the network each day may also be large. It is found by practice that UBA devices in the existing architectures have limited analysis capabilities, and a problem of repeated analysis between different UBA devices often occurs, which further affects performance efficiency.

SUMMARY

Embodiments of the present application provide a user behavior analysis method, and a related device and system, so as to improve a user behavior analysis capability and reduce a problem of repeated analysis.

In order to solve the foregoing technical problems, the embodiments of the present application provide the following technical solutions:

According to one aspect, an embodiment of the present application provides a user behavior analysis (UBA) method for use in a UBA system associated with a communication network, where the UBA system comprises a UBA cloud server, a first UBA subnode and a second UBA subnode, the UBA cloud server is associated with an analysis and decision making layer of the network, and the first and the second UBA subnodes are associated with a probe layer of the network, the method includes:

receiving, by the UBA cloud server, a network content identifier from the first UBA subnode, where the network content identifier is not identifiable by the first UBA subnode;

acquiring, by the UBA cloud server, a network content corresponding to the network content identifier;

extracting, by the UBA cloud server, a keyword from the network content;

updating, by the UBA cloud server, a behavior knowledge base by using the extracted keyword; and delivering, by the UBA cloud server, the updated behavior knowledge base or updated content of the behavior knowledge base to a UBA subnode set, where the UBA subnode set at least includes the first UBA subnode and at least the second UBA subnode.

According to another aspect, an embodiment of the present application further provides a user behavior analysis method for use in a UBA system associated with a communication network, where the UBA system comprises a UBA cloud server, a first UBA subnode and a second UBA subnode, the UBA cloud server is associated with an analysis and decision making layer of the network, and the first and the second UBA subnodes are associated with a probe layer of the network, the method including:

collecting, by the first UBA subnode, user Internet access information;

extracting, by the first UBA subnode, key Internet access information from the collected user Internet access information, where the key Internet access information includes a network content identifier;

looking up, by the first UBA subnode and in a local behavior knowledge base, a behavior record matching the key Internet access information by using the key Internet access information; and when no behavior record matching the key Internet access information is found in the local behavior knowledge base, reporting, by the first UBA subnode, the network content identifier in the key Internet access information to the UBA cloud server; and when the behavior record matching the key Internet access information is found in the local behavior knowledge base, generating, by the first UBA subnode, a user access log according to the matched behavior record, and performing user behavior modeling according to the generated user access log.

According to another aspect, an embodiment of the present application further provides a user behavior analysis (UBA) cloud server, including:

a receiving module, configured to receive a network content identifier from a first UBA subnode, where the network content identifier is not identifiable by the first UBA subnode;

an acquiring module, configured to acquire a network content corresponding to the network content identifier;

an extraction module, configured to extract a keyword from the network content;

a updating module, configured to update a behavior knowledge base by using the extracted keyword; and a delivering module, configured to deliver the updated behavior knowledge base or updated content of the behavior knowledge base to a UBA subnode set, where the UBA subnode set comprises the first UBA subnode and at least a second UBA subnode, where the UBA cloud server is associate with an analysis and decision making layer of a communication network, the first UBA subnode and the second UBA subnode are associated with a probe layer of the communication network, where a UBA system comprises the UBA cloud server, the first UBA subnode and the second UBA subnode.

According to another aspect, an embodiment of the present application further provides a user behavior analysis (UBA) subnode, including:

a collecting module, configured to collect user Internet access information;

an extraction module, configured to extract key Internet access information from the user Internet access information collected by the collecting module, where the key Internet access information includes a network content identifier;

a look-up module, configured to look up a behavior record matching the key Internet access information in a local behavior knowledge base by using the key Internet access information extracted by the extraction module; and a reporting module, configured to: when the look-up module finds no behavior record matching the key Internet access information in the local behavior knowledge base, report the network content identifier in the key Internet access information to a UBA cloud server; and a generating module, configured to: when the look-up module finds the behavior record matching the key Internet access information in the local behavior knowledge base, generate a user access log according to the behavior record matching the key Internet access information, and perform user behavior modeling according to the generated user access log, where the UBA cloud server is associate with an analysis and decision making layer of a communication network, and the UBA subnode is associated with a probe layer of the communication network, and where a UBA system comprises the UBA cloud server, the UBA subnode and a second UBA subnode.

As can be seen from the foregoing, in the embodiments of the present application, multiple UBA subnodes are deployed under a UBA cloud and the UBA cloud includes one or more UBA cloud servers, where the UBA cloud servers are at an analysis and decision making layer of a network at which the UBA cloud servers and the UBA subnodes are located, and the UBA subnodes are at a probe layer of the network at which the UBA cloud servers and the UBA subnodes are located. When the UBA cloud server receives a network content identifier reported by a first UBA subnode, where the network content identifier cannot be identified by the first UBA subnode, the UBA cloud server acquires network content corresponding to the network content identifier; extracts a keyword from the network content; updates a behavior knowledge base by using the extracted keyword; and delivers the updated behavior knowledge base or update content of the behavior knowledge base to a UBA subnode set, where the UBA subnode set at least includes a second UBA subnode and the first UBA subnode. Because a UBA cloud server that uses a cloud technology has a better analysis and processing capability than a UBA subnode, using the UBA cloud server to analyze and recognize a network content identifier that is unrecognizable by the UBA subnode helps improving a user behavior analysis capability of a UBA system. In addition, after performing analysis and recognition once, the UBA cloud server delivers a behavior knowledge base of the UBA cloud updated accordingly by the UBA cloud server, or updated content of the UBA cloud behavior knowledge base to a UBA subnode set, so that all UBA subnodes in the UBA subnode set can update their local behavior knowledge bases accordingly, which helps avoiding the problem of repeated analysis by the UBA subnodes on, for example, new network content, so as to improve timeliness of user behavior analysis and reduce resource consumption.

BRIEF DESCRIPTION OF DRAWINGS

To describe the technical solutions in the embodiments of the present application or in the prior art more clearly, the following briefly introduces the accompanying drawings used in describing the embodiments or the prior art.

DESCRIPTION OF EMBODIMENTS

Embodiments of the present application provide a user behavior analysis method, and a related device and system, so as to improve the capability of user behavior analysis and solve the problem of repeated analysis.

The following clearly describes the technical solutions in the embodiments of the present application with reference to the accompanying drawings. Apparently, the described embodiments are merely a part rather than all of the embodiments of the present application. All other embodiments obtained by a person of ordinary skill in the art based on the embodiments of the present application and without creative efforts shall fall within the protection scope of the present application.

Figure 1A:
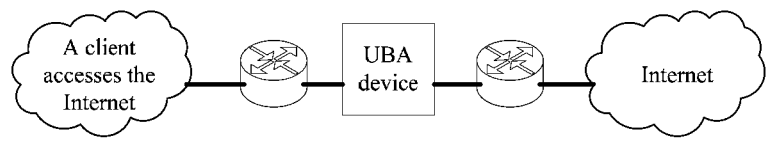
FIG. 1A is a schematic diagram of UBA device deployment scheme in the prior art.
Figure 1B:
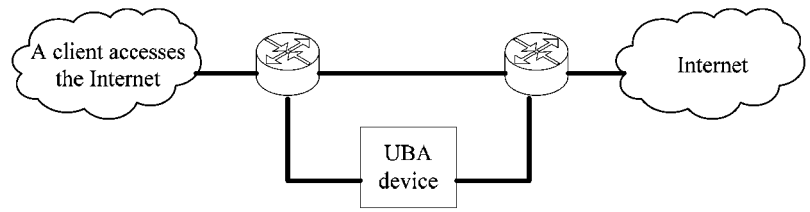
FIG. 1B is another schematic diagram of UBA device deployment in the prior art.
Figure 2:
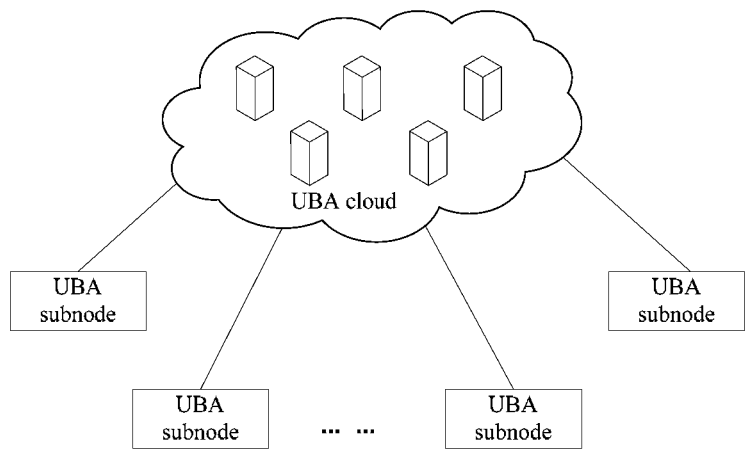
FIG. 2 is a schematic diagram of a UBA system architecture according to an embodiment of the present application.

Referring to FIG. 2, a UBA system architecture provided in an embodiment of the present application may include a UBA cloud and one or more UBA subnodes, where the UBA cloud includes one or more UBA cloud servers (for example, as shown in FIG. 2, a UBA cloud includes multiple UBA cloud servers). In the embodiment of the present application, a network layer at which the UBA cloud server is located is higher than a network layer at which the UBA subnode is located. For example, the UBA cloud server may be located at an analysis and decision making layer of a network, and the UBA subnodes may be located at a probe layer of the network. The UBA cloud server has a wider coverage range than the UBA subnode. The UBA subnode and the UBA cloud server are communicatively connected.

For example, in a mobile telecommunication network, the UBA cloud server may be at a core layer of the network (here the core layer is regarded as the analysis and decision making layer), whereas the UBA subnodes may be at an access layer of the network (here the access layer is regarded as the probe layer). In a telecommunication operation network, the UBA cloud server may be at a convergence layer of the network (here the convergence layer is regarded as the analysis and decision making layer), whereas the UBA subnodes may be in an edge network of the telecommunication operation network (here the edge network is regarded as the probe layer). In a service provider/content provider (SP/CP) network, the UBA cloud server may be in a core Internet data center (here the core Internet data center (IDC) is regarded as the analysis and decision making layer), whereas the UBA subnodes may be in a regional IDC of the service provider/content provider (SP/CP) network (here the regional IDC is regarded as the probe layer). Other types of networks may be deduced by analogy.

The following solutions provided in the embodiments of the present application may be implemented based on a UBA system with an architecture shown in FIG. 2 or an architecture varied from the architecture shown in FIG. 2.

Terms such as "first", "second", "third" and "fourth" (if existing) in the specification, claims and the accompanying drawings of the present application are used to distinguish similar objects, but are not necessarily used to describe a specific sequence or order. It should be understood that data used in this way is interchangeable in an appropriate situation, so that the embodiment of the present application described herein can, for example, be implemented in other sequences than those that are shown or otherwise described herein. In addition, terms "include/comprise" and "have" and any variations of them are intended to cover nonexclusive inclusions, so that a process, method, system, product or device including a series of units is not necessarily limited to those units, but can include other units that are not clearly listed or that are inherent in the process, method, product or device.

The user behavior analysis method according to an embodiment of the present application may be used in a UBA cloud which includes at least one UBA cloud server. The UBA cloud server is at an analysis and decision making layer of a network in which the UBA cloud server is located. The user behavior analysis method may include: receiving, by the UBA cloud server, a network content identifier reported by a first UBA subnode, where the network content identifier cannot be identified by the first UBA subnode; acquiring, by the UBA cloud server, network content corresponding to the network content identifier; extracting, by the UBA cloud server, a keyword from the network content; updating, by the UBA cloud server, a behavior knowledge base by using the extracted keyword; and delivering, by the UBA cloud server, the updated behavior knowledge base or updated content of the behavior knowledge base to a UBA subnode set, where the UBA subnode set at least includes a second UBA subnode and the first UBA subnode, where the second UBA subnode and the first UBA subnode are at a probe layer of a network in which the second UBA subnode and the first UBA subnode are located.

Figure 3:
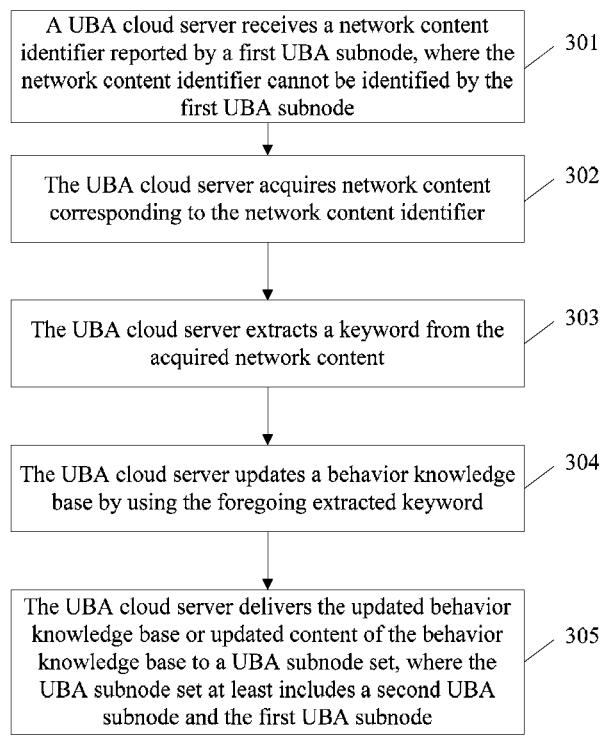
FIG. 3 is a flowchart of a user behavior analysis method according to an embodiment of the present application.

Referring to FIG. 3, a user behavior analysis method provided in an embodiment of the present application may include:

301: A UBA cloud server receives a network content identifier reported by a first UBA subnode, where the network content identifier cannot be identified by the first UBA subnode.

The network content identifier may be information that can identify a network content, such as a network file name, or a uniform resource locator (URL). When a UBA subnode (which, for ease of description, is referred to as a first UBA subnode hereinafter) of multiple UBA subnodes deployed under a UBA cloud encounters a network content identifier, and the network content identifier cannot be identified by the first UBA subnode, the first UBA subnode reports the network content identifier to a UBA cloud server. The UBA cloud server has a larger coverage area than that of the UBA subnode, so that the UBA cloud server can recognize the network content identifier more easily. The UBA subnode and the UBA cloud server are connected in a communicable manner.

In some embodiments of the present application, UBA subnodes interconnected with a UBA cloud server in a UBA cloud may be deployed in the following manners: connected in series or parallel to an independent device in a transmission network, attached to a gateway or a routing device, attached to a platform (for example, the Monternet™ platform), or in another deployment form similar to that of existing UBA devices.

In a practical application, if a UBA cloud includes multiple UBA cloud servers, after a UBA cloud server receives to-be-processed data (for example, a network content identifier reported by a UBA subnode (for example, a first UBA subnode), where the network content identifier cannot be identified by the first UBA subnode), the UBA cloud server may perform relevant processing, or randomly or nonrandomly forward the network content identifier that cannot be identified by the UBA subnode to another UBA cloud server in the UBA cloud for processing. For example, if a current processing load of the UBA cloud server is greater than a set threshold (or greater than an average processing load of the UBA cloud), the UBA cloud server may forward the network content identifier that cannot be identified by the UBA subnode to a UBA cloud server with a lightest current processing load (or a current processing load that is lighter than the average processing load of the UBA cloud) for processing, or to another UBA cloud server that is selected randomly in the UBA cloud for processing. Certainly, load balancing may be performed by the UBA cloud in another manner.

302: The UBA cloud server acquires a network content corresponding to the network content identifier.

In some embodiments of the present application, the UBA cloud server may further crawl subnet content corresponding to a subnet content identifier included in the network content. Further, the UBA cloud server may limit a crawl depth for the network content by using the following mechanism. For example, the UBA cloud server may first determine whether a current crawl depth for the network content corresponding to the network content identifier exceeds a set upper limit of crawl depth (the upper limit of crawl depth may be specifically set according to a specific need). If the current crawl depth for the network content exceeds the set upper limit of crawl depth, the UBA cloud server may stop crawling a subnet content corresponding to a subnet content identifier included in the network content. If the crawl depth for the network content does not exceed the set upper limit of crawl dept, the UBA cloud server may crawl the subnet content corresponding to the subnet content identifier included in the network content.

303: The UBA cloud server extracts one or more keywords from the acquired network content.

The keywords may be one or more types of information such as Host, title, URL and so on.

It is understandable that extracting the keywords from the network content may be directly extracting all keywords from the network content (that is, all the keywords are included in the network content), and may also be obtaining the keywords by converting information that is extracted from the network content (that is, not all keywords are directly included in the network content, and a part of or all keywords are obtained by converting the information that is extracted from the network content).

In some embodiments of the present application, the UBA cloud server may extract the keyword from the network content in the following exemplary manner. For example, the UBA cloud server performs de-noising processing on the network content (certainly, the step may also be omitted); performs word segmentation processing on the network content after the de-noising processing, to obtain multiple words; and extracts a keyword from the plurality of words according to a keyword reference parameter. The keyword reference parameter, for example, may include: a property of a word, a frequency of a word, a weight of a word, and a position of a word (the position of a word may refer to a position of the word in a sentence, and may also refer to a position of the word in a whole page), and certainly may also include other keyword reference parameters such as a relevant custom word library. Certainly, the UBA cloud server may also extract the keyword from the network content based on another existing keyword extraction technique.

304: The UBA cloud server updates a behavior knowledge base by using the extracted keyword or keywords.

In some embodiments of the present application, the UBA cloud server may, for example, obtain content categorization information according to the extracted keyword or keywords (certainly may further obtain, for example, application name information). The UBA cloud server may generate a behavior record based on the content categorization information and the keywords, and add the generated behavior record to the behavior knowledge base of the UBA cloud.

305: The UBA cloud server delivers the updated behavior knowledge base or updated content of the behavior knowledge base to a UBA subnode set, where the UBA subnode set at least includes the first UBA subnode and a second UBA subnode.

It is understandable that, if the UBA cloud includes multiple UBA cloud servers, the UBA cloud servers may jointly maintain the behavior knowledge base, each UBA cloud server may update the behavior knowledge base of the UBA cloud, and each UBA cloud server may also deliver the behavior knowledge base to a UBA subnode.

In some embodiments of the present application, the UBA cloud server may deliver, for example, proactively (periodically or aperiodically) or according to a request of a UBA subnode, the updated behavior knowledge base of the UBA cloud, (a part of or all) updated content (which may include content categorization information corresponding to the network content identifier, and certainly may also include a title, a keyword and like information corresponding to the network content identifier) of the behavior knowledge base, or a latest behavior knowledge base to the UBA subnode set. In this way, each UBA subnode in the UBA subnode set may update, after receiving the updated behavior knowledge base, the updated content of the behavior knowledge base, or the latest behavior knowledge base, a local behavior knowledge base of each UBA subnode by using the information delivered by the UBA cloud server.

Based on this mechanism, for a network content identifier that is unrecognizable by a UBA subnode (for example, for a network content identifier corresponding to currently new network content, many other UBA subnodes associated with the UBA cloud server possibly cannot recognize the network content identifier), after performing analysis and recognition once, the UBA cloud server delivers a behavior knowledge base updated accordingly by the UBA cloud server, updated content of the behavior knowledge base, or a latest behavior knowledge base to a UBA subnode set, so as to enable all UBA subnodes in the UBA subnode set to recognize the network content identifier, which helps avoiding repeated analysis performed by each UBA subnode.

As can be seen from the foregoing, in this embodiment, multiple UBA subnodes are deployed under a UBA cloud. The UBA cloud includes at least one UBA cloud server, where the UBA cloud server is at an analysis and decision making layer of a network in which the UBA cloud server is located, and the UBA subnodes are at a probe layer of the network in which the UBA cloud server is located. When the UBA cloud server receives a network content identifier reported by a first UBA subnode, and the network content identifier cannot be identified by the first UBA subnode, the UBA cloud server acquires network content corresponding to the network content identifier, extracts a keyword from the network content, updates a behavior knowledge base by using the extracted keyword, and delivers the updated behavior knowledge base or update content of the behavior knowledge base to a UBA subnode set, where the UBA subnode set includes the first UBA subnode and a second UBA subnode.

Because a UBA cloud that uses a cloud technology has a better analysis and processing capability than a UBA subnode, using a UBA cloud server to analyze and recognize a network content identifier that is unrecognizable by the UBA subnode helps improving a user behavior analysis capability of a UBA system. In addition, after performing analysis and recognition once, the UBA cloud server delivers a UBA cloud behavior knowledge base updated accordingly by the UBA cloud server, or updated content of the UBA cloud behavior knowledge base to a UBA subnode set, so that all UBA subnodes in the UBA subnode set can update their local behavior knowledge bases accordingly, which helps avoiding the problem of repeated analysis by the multiple UBA subnodes on, for example, new network content, so as to improve timeliness of user behavior analysis and reduce resource consumption.

In some embodiments of the present application, after receiving the network content identifier that cannot be identified and is reported by the first UBA subnode, the UBA cloud server may first look up a behavior record matching the network content identifier in the behavior knowledge base by using the network content identifier (for example, using the network content identifier as an index, or using information obtained by converting the network content identifier as an index). If the behavior record matching the network content identifier is found in the behavior knowledge base, the UBA cloud server may deliver, to the first UBA subnode, content categorization information corresponding to the network content identifier and included in the behavior record matching the network content identifier (certainly, the UBA cloud server may further deliver, to the first UBA subnode, a title, a keyword and like information corresponding to the network content identifier and included in the behavior record matching the network content identifier, and may even deliver all information included in the behavior record matching the network content identifier to the first UBA child node). If no behavior record matching the network content identifier is found in the behavior knowledge base, the UBA cloud server may notify the first UBA subnode of a recognition failure, or the UBA cloud server may acquire network content corresponding to the network content identifier, extract a keyword from the network content, update the behavior knowledge base by using the extracted keyword, and deliver the updated behavior knowledge base, or (a part of or all) updated content (which may include content categorization information corresponding to the network content identifier, and certainly may also include information such as a title and a keyword that are corresponding to the network content identifier) of the behavior knowledge base to a UBA subnode set, where the UBA subnode set at least includes the first UBA subnode, a second UBA subnode, and the like.

In another embodiment of the present application, the UBA cloud server may update the behavior knowledge base of the UBA cloud server based on another mechanism, and deliver the updated behavior knowledge base of the UBA cloud server, updated content of the behavior knowledge base, or a latest behavior knowledge base of the UBA cloud server to the UBA subnode set.

In some embodiments of the present application, the UBA cloud server may, for example, limit a crawl depth for network content by using the following mechanism. After crawling the network content corresponding to the network content identifier, the UBA cloud server may further determine whether a current crawl depth for the network content corresponding to the network content identifier exceeds a set upper limit of crawl depth. If the current crawl depth for the network content exceeds the set upper limit of crawl depth, the UBA cloud server may stop crawling a subnet content corresponding to a subnet content identifier that is included in the network content corresponding to the network content identifier (the subnet content identifier is relative and is included in network content corresponding to a network content identifier, for example, multiple network content identifiers is included in network content corresponding to a network content identifier, then the plurality of network content identifiers may be regarded as subnet content identifiers of the network content identifier, and network content identifiers included in network content that is corresponding to the subnet content identifiers may further be regarded as second-generation subnet content identifiers of the subnet content identifiers, and so on). If the crawl depth for the network content does not exceed the set upper limit of crawl dept, the UBA cloud server may further crawl the subnet content corresponding to the subnet content identifier that is included in the network content corresponding to the network content identifier, further extract a keyword from the subnet content corresponding to a subnet content identifier that is included in the network content, update the behavior knowledge base by using the extracted keyword, and deliver the updated behavior knowledge base or updated content of the behavior knowledge base to the UBA subnode set. Based on the mechanism for limiting the crawl depth of the network content, the UBA cloud server may crawl content of a controllable depth according to a need, which helps better balancing resource occupation and demand.

In addition, the UBA cloud server may further acquire user behavior analysis reports (for example, user access interest ranking reports corresponding to one or more users) or Internet behavior analysis reports (for example, Internet access ranking reports corresponding to multiple websites or resources) generated by a UBA subnode set; aggregate the acquired user behavior analysis reports or Internet behavior analysis reports, to obtain an aggregated user behavior analysis report (for example, a user access interest ranking report corresponding to one or more users) or Internet behavior analysis report (for example, an Internet access ranking report corresponding to multiple websites or resources). Subsequently, an operator can accordingly perform high value-added services such as a precise advertisement push service.

The user behavior analysis method according to another embodiment of the present application may be applied to a UBA cloud including at least one UBA cloud server, where the UBA cloud server is at an analysis and decision making layer of a network in which the UBA cloud server is located. The method may include the following content: the UBA cloud server receives a network content identifier reported by a first UBA subnode, where the network content identifier cannot be identified by the first UBA subnode; the UBA cloud server looks up, in a behavior knowledge base, a behavior record matching the network content identifier by using the network content identifier; and if the behavior record matching the network content identifier is found in the behavior knowledge base, the UBA cloud server may deliver, to the first UBA subnode, a latest behavior knowledge base, or content categorization information corresponding to the network content identifier and included in the behavior record matching the network content identifier (certainly, the UBA cloud server may further deliver, to the first UBA subnode, a title, a keyword and like information corresponding to the network content identifier and included in the behavior record matching the network content identifier, and the UBA cloud server may even deliver all information included in the behavior record matching the network content identifier to the first UBA subnode). In addition, if the UBA cloud server finds no behavior record matching the network content identifier in the behavior knowledge base, the UBA cloud server may acquire network content corresponding to the network content identifier; the UBA cloud server extracts a keyword from the network content; the UBA cloud server updates the behavior knowledge base by using the extracted keyword; and the UBA cloud server delivers the updated behavior knowledge base or updated content of the behavior knowledge base to a UBA subnode set, where the UBA subnode set at least includes a second UBA subnode and the first UBA subnode, where the second UBA subnode and the first UBA subnode are at a probe layer of a network in which the second UBA subnode and the first UBA subnode are located. Correspondingly, the first UBA subnode (and the second UBA subnode) may update a local behavior knowledge base by using the information delivered by the UBA cloud server.

In another embodiment of the user behavior analysis method according to the present application, the method may include: a first UBA subnode collects user Internet access information; the first UBA subnode extracts key Internet access information from the collected user Internet access information, where the key Internet access information includes a network content identifier; the first UBA subnode looks up, in a local behavior knowledge base, a behavior record matching the key Internet access information by using the key Internet access information; and if no behavior record matching the key Internet access information is found in the local behavior knowledge base, the first UBA subnode reports the network content identifier in the key Internet access information to a UBA cloud server, where the UBA cloud server is at an analysis and decision making layer of a network in which the UBA cloud server is located, and the first UBA subnode is at a probe layer of the network in which the UBA cloud server is located; and if the behavior record matching the key Internet access information is found in the local behavior knowledge base, the first UBA subnode generates a user access log according to the successfully matched behavior record in the local behavior knowledge base, and performs user behavior modeling according to the generated user access log.

Figure 4:
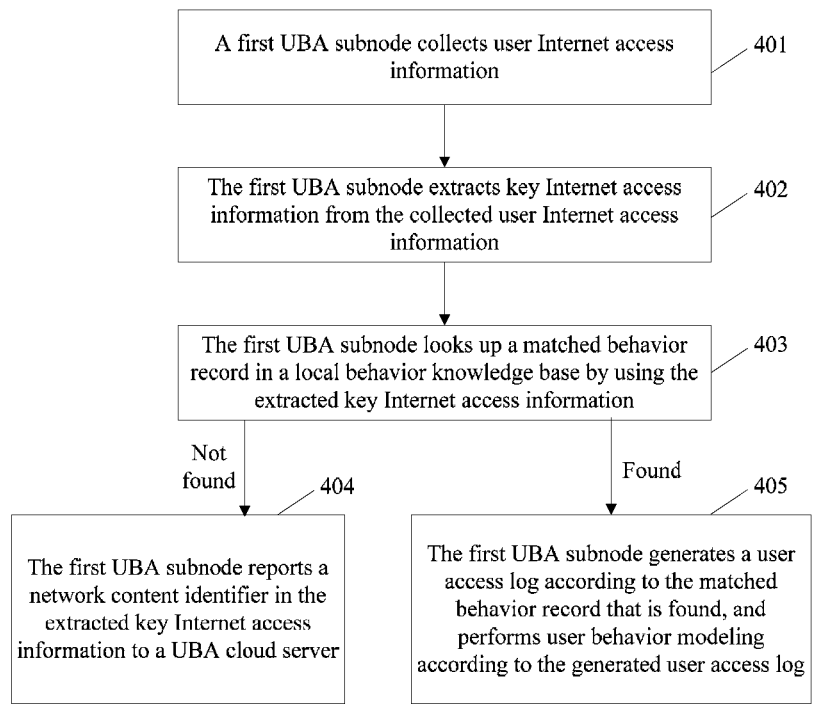
FIG. 4 is a flowchart of another user behavior analysis method according to an embodiment of the present application.

Referring to FIG. 4, a user behavior analysis method provided in another embodiment of the present application may include:

401: A first UBA subnode collects a user's Internet access information.

In some embodiments of the present application, UBA subnodes associated with a UBA cloud server may be deployed in following manners: connected in series or parallel to an independent device in a transmission network, attached to a gateway or routing device, attached to a platform (for example, the Monternet™ platform), or in another deployment form similar to that of existing UBA devices, where the UBA cloud server is at an analysis and decision making layer of a network in which the UBA cloud server is located, and the first UBA subnode is at a probe layer of the network in which the UBA cloud server is located.

402: The first UBA subnode extracts key Internet access information from the collected user Internet access information.

The key Internet access information extracted by the first UBA subnode may include, for example, one or more types of the following information: a user name, user-agent information, a network content identifier (such as a URL), time information, domain name information, a response code and other existing service parameters.

It is understandable that the extracting, by the first UBA subnode, key Internet access information from the user Internet access information may be directly extracting all key Internet access information from the user Internet access information (that is, the user Internet access information includes all key Internet access information), and may also be obtaining the key Internet access information by converting information extracted from the user Internet access information (that is, all key Internet access information is not directly included in network content, and a part of or all key Internet access information is obtained by converting the information extracted from the network content).

403: The first UBA subnode looks up, in a local behavior knowledge base, a behavior record matching the key Internet access information by using the extracted key Internet access information.

If no behavior record matching the key Internet access information is found in the local behavior knowledge base (which indicates that no record can match the extracted key Internet access information, and in this case, the first UBA subnode is considered to be incapable of recognizing a network content identifier in the key Internet access information), step 404 is performed. If the behavior record matching the key Internet access information is found in the local behavior knowledge base (which indicates that there is a record that can match the extracted key Internet access information, and successful matching means that the first UBA subnode can be considered to be capable of recognizing the network content identifier in the key Internet access information), step 405 is performed.

404: The first UBA subnode reports a network content identifier in the extracted key Internet access information to a UBA cloud server (certainly, the first UBA subnode may further report other information in the key Internet access information, such as time information, domain name information and a user name, to the UBA cloud server).

405: The first UBA subnode generates a user access log according to the behavior record that is found and matches the key Internet access information, and performs user behavior modeling according to the generated user access log. Further, the first UBA subnode may further generate a user behavior analysis report (for example, a user access interest ranking report corresponding to one or more users) or an Internet behavior analysis report (for example, an Internet access ranking report corresponding to multiple websites and resources) according to a modeling result.

As can be seen from the foregoing, in the embodiment of the present application, a UBA subnode deployed under a UBA cloud may collect user Internet access information, extract key Internet access information from the collected user Internet access information, match the key Internet access information with a record in a local behavior knowledge base. If the matching fails, the UBA subnode may report a network content identifier in the key Internet access information to a UBA cloud server. This lays a foundation for the UBA cloud server to analyze and recognize the network content identifier that is unrecognizable by the UBA subnode. Because a UBA cloud server that uses a cloud technology has a better analysis and processing capability than a UBA subnode, where the UBA cloud server is at an analysis and decision making layer of a network in which the UBA cloud server is located, and the UBA subnode is at a probe layer of the network in which the UBA cloud server is located, using the UBA cloud server to analyze and recognize a network content identifier that is unrecognizable by the UBA subnode helps improving a user behavior analysis capability of a UBA system. In addition, after performing analysis and recognition once, the UBA cloud server may further deliver a behavior knowledge base updated accordingly by the UBA cloud server, or updated content of the behavior knowledge base to multiple UBA subnodes, so that all UBA subnodes can update their local behavior knowledge bases accordingly, which helps avoiding the problem of repeated analysis by the UBA subnodes on, for example, new network content, so as to improve timeliness of user behavior analysis and relatively reduce resource consumption.

In addition, the first UBA subnode may further proactively (periodically or aperiodically) report, to the UBA cloud server, a user behavior analysis report (for example, a user access interest ranking report corresponding to one or more users) or an Internet behavior analysis report (for example, an Internet access ranking report corresponding to multiple websites and resources) generated by the first UBA subnode. Alternatively, the first UBA subnode may also report, under an instruction of the UBA cloud server, to the UBA cloud server, a user behavior analysis report (for example, a user access interest ranking report corresponding to one or more users) or an Internet behavior analysis report (for example, an Internet access ranking report corresponding to multiple websites and resources) generated by the first UBA subnode. The UBA cloud server may aggregate user behavior analysis reports or Internet behavior analysis reports reported by multiple UBA subnodes that are associated with the UBA cloud server, so as to obtain an aggregated user behavior analysis report or Internet behavior analysis report. Subsequently, an operator can accordingly perform high value-added services such as a precise advertisement push service.

In some embodiments of the present application, a first UBA subnode may receive information delivered by the UBA cloud server, such as a latest behavior knowledge base, an updated behavior knowledge base, or updated content of a behavior knowledge base of the UBA cloud server, or content categorization information corresponding to a network content identifier that is unrecognizable by the first UBA subnode, and even a title, a keyword and like information corresponding to the network content identifier. The first UBA subnode may receive the information proactively delivered by the UBA cloud server, or the first UBA subnode may also send a behavior knowledge base updating request to the UBA cloud server, and then receive the information, which is delivered by the UBA cloud server after the UBA cloud server receives the behavior knowledge base updating request; and the first UBA subnode may update a local behavior knowledge base of the first UBA subnode by using the information delivered by the UBA cloud server. Certainly, all other UBA subnodes deployed under the UBA cloud can update their local behavior knowledge bases in the foregoing manner.

An embodiment of the present application further provides a method for crawling network content, which may include the following: a UBA cloud server or a UBA subnode crawls a second network content corresponding to a second network content identifier (where the second network content identifier may be a network content identifier configured in the UBA cloud server, and may also be a network content identifier included in network content that is acquired by the UBA cloud server, and may also be a corresponding network content identifier that is reported by the UBA subnode); determines whether a current crawl depth for the second network content corresponding to the second network content identifier exceeds a set upper limit of crawl depth (where the upper limit of crawl depth may be set to, for example, 5, 6, 7, 8, 9 or another value). If the current crawl depth for the network content exceeds the set upper limit of crawl depth, stops crawling a subnet content corresponding to a subnet content identifier that is included in the network content. If the crawl depth for the network content does not exceed the set upper limit of crawl dept, crawls the subnet network content corresponding to the subnet content identifier that is included in the network content. It is understandable that, based on the control mechanism for the crawl depth for the network content, the UBA cloud server or the UBA subnode may crawl content of a controllable depth according to a need, which helps better balancing resource occupation and demand.

In order to better understand and implement the foregoing solutions of the embodiments of the present application, the following uses several application scenarios as examples for specific description.

The following is mainly based on, for example, a UBA system architecture shown in FIG. 2.

The UBA system architecture may include a UBA cloud and multiple UBA subnodes.

In some embodiments of the present application, UBA subnodes deployed under a UBA cloud may be deployed in the following several manners: connected in series or parallel to an independent device in a transmission network, attached to a gateway or routing device, attached to a platform (for example, the Monternet™ platform), or in another deployment form similar to that of existing UBA devices. The UBA cloud includes one or more UBA cloud servers, and the UBA cloud servers are in a convergence network, and the UBA subnodes are in an edge network.

Each UBA subnode mainly accomplishes, for example, the following functions:

$W_s1$: user behavior analysis within a coverage area of the UBA subnode; and $W_s2$: reporting a network content identifier to the UBA cloud, where the network content identifier cannot be identified by the UBA subnode.

Figure 5:
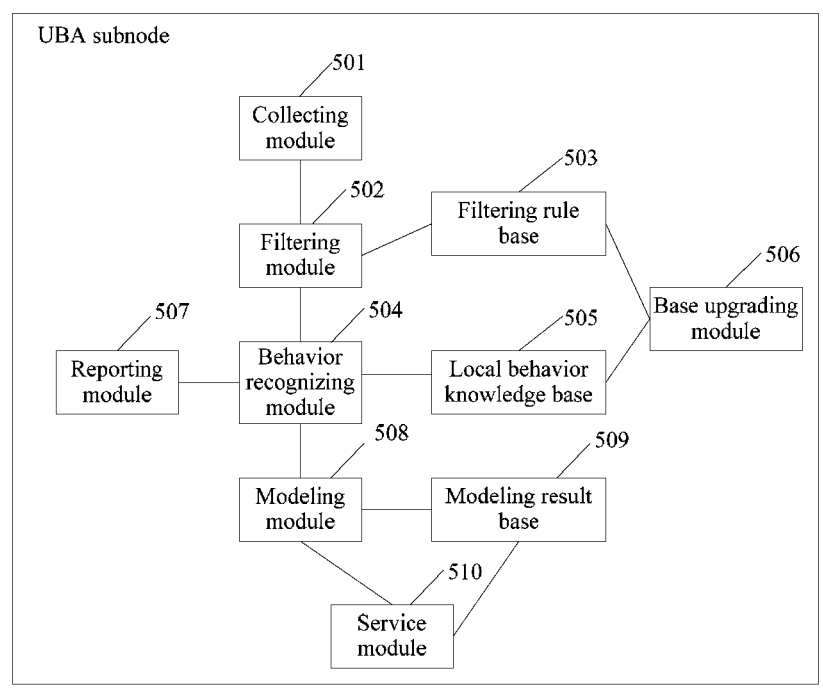
FIG. 5 is a simplified block diagram of a UBA subnode according to an embodiment of the present application.

In one application scenario, referring to FIG. 5, a UBA subnode may include: a collecting module 501, a filtering module 502, a filtering rule base 503, a behavior recognizing module 504, a local behavior knowledge base 505, a base updating module 506, a reporting module 507, a modeling module 508, a modeling result base 509 and a service module 510.

The collecting module 501 may be configured to collect user Internet access information (for example, user access log information), where the user Internet access information may include one or more types of the following information: a network content identifier (such as a URL), time information, a user name, domain name information, a response code, user-agent information, and the like.

The filtering module 502 is configured to filter illegal user Internet access information collected by the collecting module 501. For example, the filtering module 502 may perform legality check on a length of the URL in the user Internet access information, and filter user Internet access information whose URL length exceeds a threshold.

The filtering rule base 503 may include multiple filtering rules, and the filtering module 502 may filter, according to one or more filtering rules in the filtering rule base 503, the user Internet access information collected by the collecting module 501.

For example, an example of a filtering rule record in the filtering rule base 503 is shown in Table 1.

TABLE 1

| Field | Meaning |
| --- | --- |
| Domain name | Field names extracted from a user Internet access record, for example, a URL |
| Rule type | There may be categories such as length and type, for example, length |
| Value | A specific value, for example, a value whose largest length of the URL does not exceed 2083 |
| ... | ... |

The local behavior knowledge base 505 of the UBA subnode may include multiple behavior records. An example of a behavior record in the local behavior knowledge base 505 of the UBA subnode is shown in Table 2.

TABLE 2

| Field | Meaning |
| --- | --- |
| Network ID | Uniquely identifies one piece of network content, may be obtained through Hash calculation by using a URL and the Network ID is used for fast querying |
| Network content identifier | A uniform identifier that uniquely identifies one piece of network content, that is, a URL |
| Website name | A network SP/CP to which content corresponding to the network ID belongs, for example, Sina web portal |
| Application name | An application name corresponding to the network ID, for example, sina weibo |
| Content category | A content category corresponding to the network ID, for example, news |
| Title | A title of content corresponding to the network ID |
| Keyword | A subject keyword of content corresponding to the network ID, for example, in an article that introduces a mobile phone, mobile phone may be its keyword |
| ... | ... |

The behavior recognizing module 504 is configured to extract key Internet access information from the user Internet access information collected by the collecting module 501, and look up a behavior record matching the extracted key Internet access information in a local behavior knowledge base of the behavior recognizing module 504 by using the extracted key Internet access information. For example, an index identifier may be calculated by using a Hash algorithm (or another algorithm) according to a URL (or other information) in the key Internet access information. Each record in the local behavior knowledge base includes at least one index identifier (the index identifier in the record is certainly also obtained through calculation by using the Hash algorithm (or another algorithm) according to the URL (or other information) in the key Internet access information). The behavior recognizing module 504 obtains an index identifier by using the key Internet access information, and looks up a behavior record matching the index identifier in the local behavior knowledge base by using the index identifier; and if the behavior record matching the index identifier is found, it indicates that a URL in the key Internet access information is recognizable, and it also indicates that the key Internet access information is recognizable, so that a corresponding user Internet access behavior is recognizable; and if no matched behavior record is found, it indicates that a URL in the key Internet access information is unrecognizable, and it also indicated that the key Internet access information is unrecognizable, so that a corresponding user Internet access behavior is unrecognizable, and so on.

The reporting module 507 is configured to report, to a UBA cloud server, a network content identifier (such as a URL) in the key Internet access information that is unrecognizable by the behavior recognizing module 504. Certainly, the reporting module 507 may further report time information, domain name information, user-agent information, and the like in the key Internet access information together.

The modeling module 508 is configured to perform user behavior modeling according to a local behavior record matched by the behavior recognizing module 504. For example, the user behavior modeling may be performed by using a frequency algorithm, a Support Vector Machine (SVM) or another existing modeling algorithm.

The modeling result base 509 is configured to record a user behavior modeling result of the modeling module 508.

An example of a modeling result record in the modeling result base 509 is shown in Table 3.

TABLE 3

| Field | Meaning |
| --- | --- |
| User ID | An ID that uniquely identifies a user, for example, a mobile number |
| Interest category | A category that the user is interested in, which may be more than one |
| ... | ... |

The base updating module 506 is configured to proactively acquire or passively receive a behavior knowledge base of the UBA cloud server, and update the local behavior knowledge base 505 based on the behavior knowledge base of the UBA cloud server.

The service module 510 is configured to provide services including but not limited to the following: querying for user interests, querying for a user group that is interested in one category of interest words, and the like.

The UBA cloud server mainly accomplishes, for example, the following functions:

$W_y1$: analyzing network-wide Internet behaviors;
$W_y2$: establishing a network-wide behavior knowledge base;
$W_y3$: providing a manual auditing interface; and
$W_y4$: providing a service interface for acquiring a latest behavior knowledge base.

Figure 6:
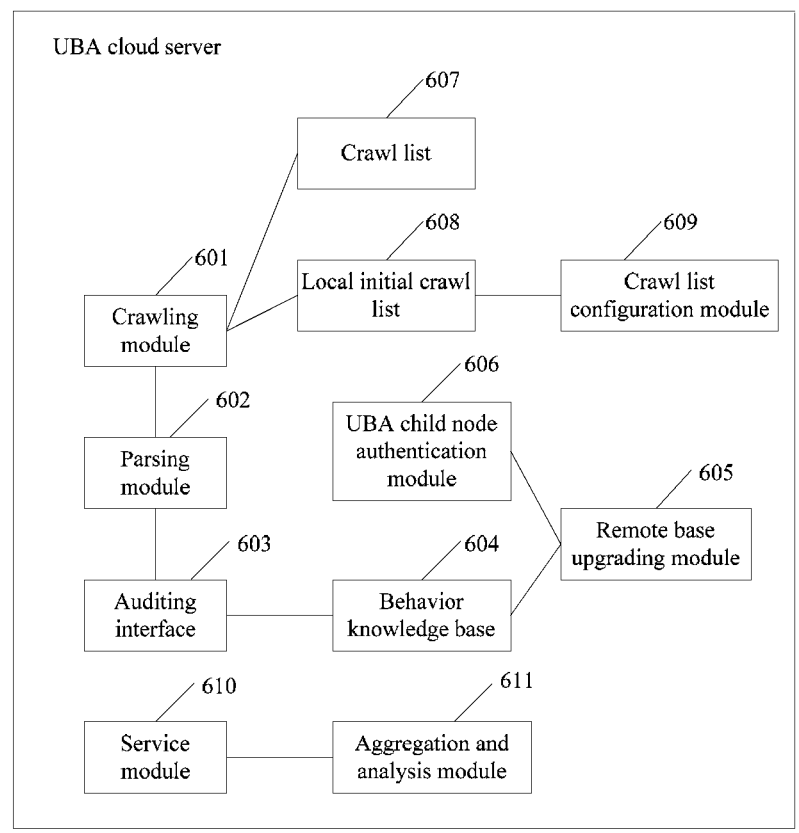
FIG. 6 is a simplified block diagram of a UBA cloud server according to an embodiment of the present application.

In an application scenario, referring to FIG. 6, a UBA cloud server may include:

a crawling module 601, a parsing module 602, an auditing module 603, a behavior knowledge base 604, a remote base updating module 605, a UBA subnode authentication module 606, a crawl list 607, a local initial crawl list 608, a crawl list configuration module 609, a service module 610, and an aggregation and analysis module 611.

The crawling module 601 is configured to acquire network content corresponding to a network content identifier (such as a URL). The network content identifier used by the crawling module 601 to crawl network content may come from two sources: one is reported by a UBA subnode, and the other is that the UBA cloud server locally configures relatively active websites in a local region.

The parsing module 602 is configured to parse the network content acquired by the crawling module 601, so as to extract a keyword from the network content (for example, information such as a title and another keyword), obtain, according to the keyword, content categorization information by using a clustering algorithm (such as an SVM algorithm), and generate a behavior record and add the generated behavior record to the behavior knowledge base 604.

The behavior knowledge base 604 may include multiple behavior records.

An example of a behavior record in the behavior knowledge base maintained by the UBA cloud server is shown in Table 4.

TABLE 4

| Field | Meaning |
| --- | --- |
| Network ID | Uniquely identifies one piece of network content, may be obtained through Hash calculation by using a URL and is used for fast query |
| Network content identifier | A uniform identifier that uniquely identifies one piece of network content, that is, a Uniform Resource Locator (URL) |
| Website name | A network SP/CP to which content corresponding to the network ID belongs, for example, Sina web portal |
| Application name | An application name corresponding to the network ID, for example, sina weibo |
| Content category | A content category corresponding to the network ID, for example, news |
| Title | A title of content corresponding to the network ID |
| Keyword | A subject keyword of content corresponding to the network ID, for example, in an article that introduces a mobile phone, mobile phone may be its keyword |
| Update timestamp | A timestamp for a last update, used for aging of local records |
| . . . | . . . |

The auditing interface 603 provides an interface for checking or correcting the content categorization information.

The crawl list configuration module 609 may be configured to configure the local initial crawl list 608 according to an active degree. For example, a news portal website has a large quantity of updated content every day and is configured in the local initial crawl list 608.

An example of a crawl record in the local initial crawl list 608 is shown in Table 5.

TABLE 5

| Field | Meaning |
| --- | --- |
| Network ID | Uniquely identifies one piece of network content and may be obtained through Hash calculation by using a URL |
| Network content identifier | A uniform identifier that uniquely identifies one piece of network content, that is, a URL, and an initial URL of a website to be crawled, for example, the initial URL of Baidu portal is www.baidu.com |
| . . . | . . . |

The crawl list 607 records a network content identifier reported by a UBA subnode, and a network content identifier included in the network content that is obtained by crawling by the crawling module 601.

An example of a crawl record in the crawl list 607 is shown in Table 6.

TABLE 6

| Field | Meaning |
| --- | --- |
| Network ID | Uniquely identifies one piece of network content and may be obtained through Hash calculation by using a URL |
| Network content identifier | A uniform identifier that uniquely identifies one piece of network content, that is, a URL |

TABLE 6-continued

| Field | Meaning |
| --- | --- |
| Number of recursions | The number of crawls to terminate the seeded URL, which is configurable |
| . . . | . . . |

The remote base updating module 605 is configured to deliver a latest behavior knowledge base to the UBA subnode.

The aggregation and analysis module 611 is configured to collect analysis results of user behavior analysis reports (for example, user access interest ranking reports corresponding to one or more users) or Internet behavior analysis reports (for example, Internet access ranking reports corresponding to multiple websites or resources) that are generated by UBA subnodes, and perform aggregation and analysis to obtain an aggregated user behavior analysis report (for example, a user access interest ranking report corresponding to one or more users) or Internet behavior analysis report (for example, an Internet access ranking report corresponding to multiple websites or resources).

The service module 610 is configured to provide a service interface for acquiring the user behavior analysis reports or Internet behavior analysis reports.

The UBA subnode authentication module 606 is configured to perform authentication on the UBA subnode, where a successfully authenticated UBA subnode is successfully associated with the UBA cloud server.

It is understandable that a part of the modules included in the UBA subnode and the UBA cloud server that are provided in the foregoing examples may be omitted, and multiple modules thereof may be integrated into one module, where a module thereof may be split into multiple modules, or a function of a module may be integrated into one or more other modules.

The following describes an exemplary procedure of a user behavior analysis method which includes a process where a UBA cloud server updates a local behavior knowledge base of a UBA subnode.

Figure 7:
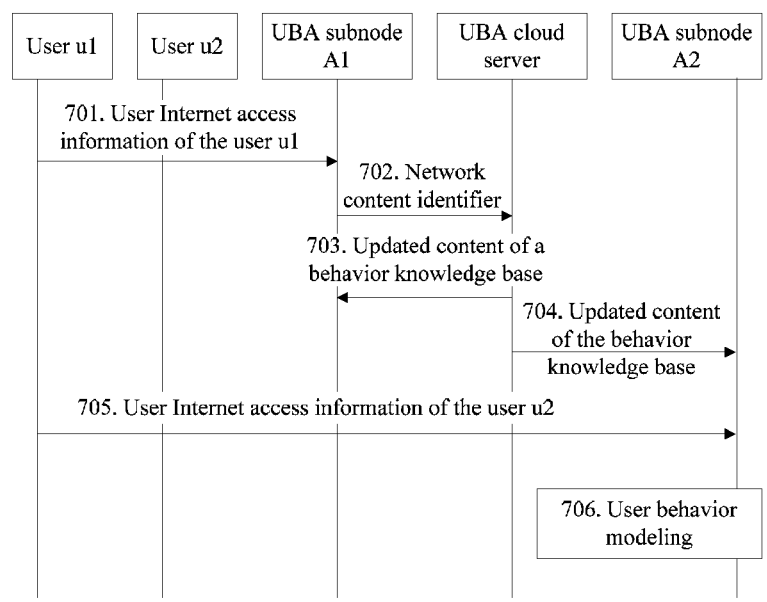
FIG. 7 is a flow diagram of another user behavior analysis method according to an embodiment of the present application.

Referring to FIG. 7, a specific procedure may include:

701: A UBA subnode A1 collects user Internet access information of a user u1.

702: The UBA subnode A1 extracts key Internet access information from the user Internet access information of the user u1, and looks up, in a local behavior knowledge base, a behavior record matching the key Internet access information by using the key Internet access information.

Here, it is assumed that no behavior record matching the key Internet access information is found in the local behavior knowledge base (that is, the UBA subnode A1 cannot recognize a network content identifier in the key Internet access information), and the UBA subnode A1 reports a network content identifier in the key Internet access information to a UBA cloud server.

703: The UBA cloud server acquires network content corresponding to a network content identifier reported by the UBA subnode A1, where the network content identifier cannot be identified by the UBA subnode A1; extracts a keyword from the network content; updates a behavior knowledge base by using the extracted keyword; and delivers the updated behavior knowledge base or updated content of the behavior knowledge base to a UBA subnode set.

The UBA subnode set includes the UBA subnode A1 and a UBA subnode A2 that are deployed under the UBA cloud server. The UBA subnode A1 and the UBA subnode A2 use the updated behavior knowledge base or updated content of the behavior knowledge base that is delivered by the UBA cloud server, to update local behavior knowledge bases of the UBA subnode A1 and the UBA subnode A2.

The UBA subnode A1 looks up a matched behavior record in the updated local behavior knowledge base (here, a matched behavior record can be found) by using the extracted key Internet access information; and generates a user access log according to the found matched behavior record. The UBA subnode A1 performs user behavior modeling according to the generated user access log; and the UBA subnode A1 generates a user behavior analysis report or an Internet behavior analysis report according to a modeling result.

704: The UBA subnode A2 collects user Internet access information of a user u2, where it is assumed that the user u2 accesses a same website or resource as the user u1.

705: The UBA subnode A2 extracts key Internet access information from the collected user Internet access information.

By looking up, in the local behavior knowledge base, a behavior record matching the key Internet access information by using the key Internet access information (because the UBA subnode A2 has updated the local behavior knowledge base, the behavior record is recognizable), 706: the UBA subnode A2 may generate a user access log according to the matched behavior record. The UBA subnode A2 performs user behavior modeling according to the generated user access log; and the UBA subnode A2 generates a user behavior analysis report or an Internet behavior analysis report according to a modeling result.

The following describes an exemplary procedure of updating a behavior knowledge base by a UBA cloud server.

Figure 8:
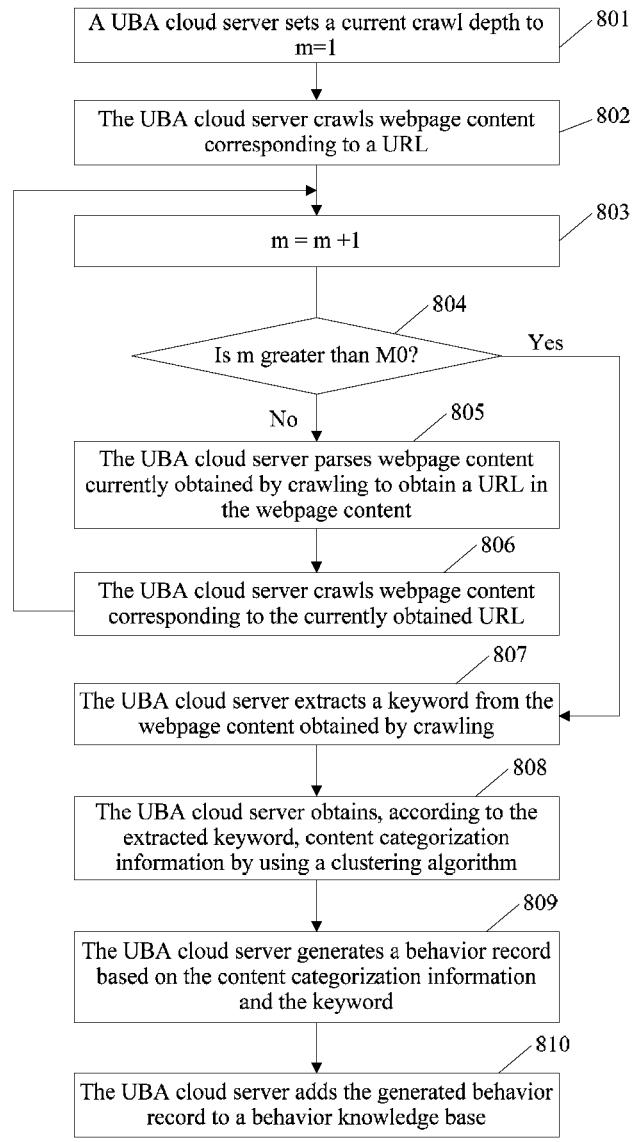
FIG. 8 is a flowchart of updating a behavior knowledge base by a UBA cloud according to an embodiment of the present application.

Referring to FIG. 8, a specific procedure may include:

801: A UBA cloud server sets a current crawl depth to m=1.

802: The UBA cloud server crawls webpage content corresponding to a URL.

The URL in step 802 may be configured in the UBA cloud server, or may be included in a piece of network content that is acquired by the UBA cloud server, or may be reported by a UBA subnode.

803: m=m+1.

804: The UBA cloud server determines whether the current crawl depth m exceeds a set upper limit of crawl depth M0.

If the current crawl depth m does not exceed the set upper limit of crawl depth M0, step 805 is performed; and if the current crawl depth m exceeds the set upper limit of crawl depth M0, step 807 is performed.

805: The UBA cloud server parses webpage content currently obtained by crawling to obtain a URL in the webpage content.

806: The UBA cloud server crawls webpage content corresponding to the URL that is currently obtained, and returns to step 803.

807: The UBA cloud server extracts a keyword (such as a Host, a title or another keyword) from the webpage content obtained by crawling.

808: The UBA cloud server obtains, according to the extracted keyword, content categorization information by using a clustering algorithm.

809: The UBA cloud server generates a behavior record based on the content categorization information and keyword.

810: The UBA cloud server adds the generated behavior record to the behavior knowledge base.

As can be seen from the foregoing, the UBA cloud server may restrict the crawl depth according to a need, which helps better balancing resource occupation and demand.

The following describes an exemplary procedure of delivering a behavior knowledge base by a UBA cloud server.

Figure 9:
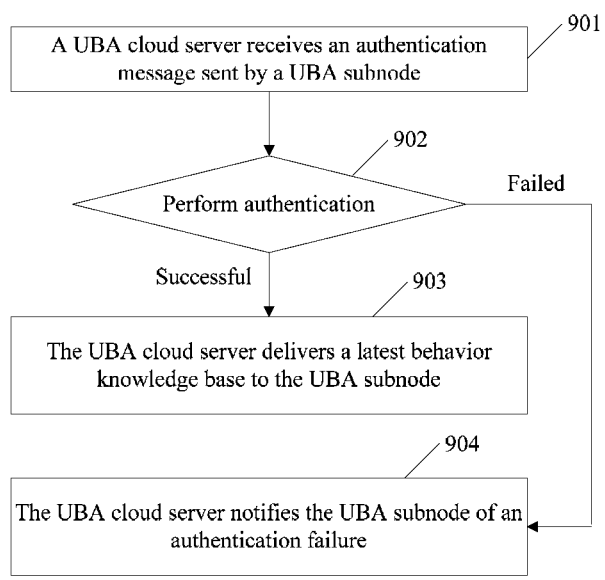
FIG. 9 is a flowchart of delivering a behavior knowledge base by a UBA cloud according to an embodiment of the present application.

Referring to FIG. 9, specific steps may include:

901: A UBA cloud server receives an authentication message sent by a UBA subnode.

902: The UBA cloud server authenticates the authentication message.

If the authentication is successful, step 903 is performed; and if the authentication fails, step 904 is performed.

903: The UBA cloud server delivers a latest behavior knowledge base to the UBA subnode; and the UBA subnode updates a local behavior knowledge base of the UBA subnode by using the latest behavior knowledge base.

904: The UBA cloud server notifies the UBA subnode of an authentication failure.

As can be seen from the foregoing, introduction of an authentication mechanism helps improving security and reliability of a UBA system.

The following describes an exemplary procedure of performing user behavior modeling by a UBA subnode.

Figure 10:
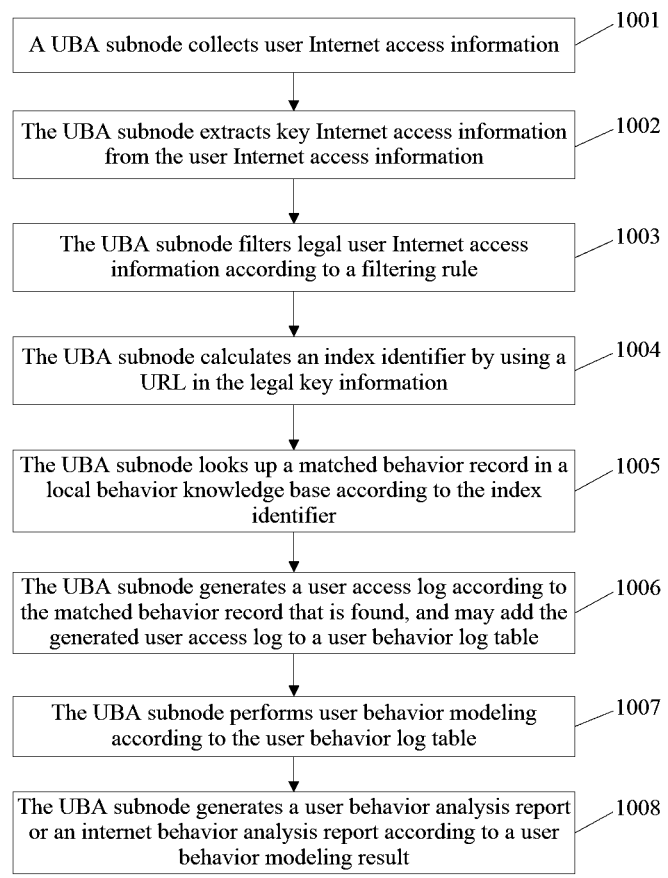
FIG. 10 is a flowchart of performing user behavior modeling by a UBA subnode according to an embodiment of the present application.

Referring to FIG. 10, specific steps may include:

1001: A UBA subnode collects user Internet access information.

The user Internet access information collected by the UBA subnode may be one or more types of the following information:

a user name, time, a URL, domain name information, user-agent information, a response code, other service parameters, and the like.

1002: The UBA subnode extracts key Internet access information from the user Internet access information.

The key Internet access information extracted by the UBA subnode may be one or more types of the following information:

a user name, time, a URL, domain name information, user-agent information, and the like.

1003: The UBA subnode filters legal user Internet access information according to a filtering rule.

For example, legal user Internet access information selected by the UBA subnode is information in which a length of a URL in key Internet access information is within 2083 bytes.

1004: The UBA subnode calculates an index identifier by using a URL in legal key information.

1005: The UBA subnode looks up a matched behavior record in a local behavior knowledge base according to the index identifier; where:

a record in the local behavior knowledge base includes but is not limited to: a website, an application name, a category, and the like; and if no matched behavior record is found, report the URL in the key Internet access information to a UBA cloud server; and if a matched behavior record is found, perform step 1006.

1006: The UBA subnode generates a user access log according to the found matched behavior record, and may add the generated user access log to a user behavior log table.

1007: The UBA subnode performs user behavior modeling according to the user behavior log table.

The UBA subnode may perform the user behavior modeling based on, for example, an SVM or a statistical frequency algorithm.

1008: The UBA subnode generates a user behavior analysis report or an Internet behavior analysis report according to a user behavior modeling result.

In addition, the UBA cloud server may collect user behavior analysis reports or Internet behavior analysis reports generated by UBA subnodes, for example, reports on TOP N websites, or reports on TOP N traffic volumes. The UBA cloud server may aggregate the user behavior analysis reports or Internet behavior analysis reports generated by the UBA subnodes, to obtain an aggregated user behavior analysis report or Internet behavior analysis report. For example, reports on TOP N websites generated by the UBA subnodes are aggregated to obtain a network-wide report on TOP N websites.

The following describes an example that a UBA cloud server assists a router in implementing a precise advertisement push service.

Figure 11:
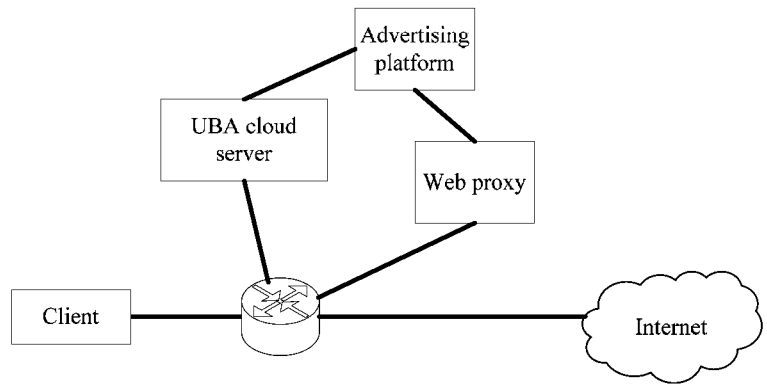
FIG. 11 is a schematic diagram of an advertisement push architecture according to an embodiment of the present application.

For example, as shown in FIG. 11, a UBA cloud server acquires user Internet access information from a router (the user Internet access information includes a user name, a URL, a domain name, and the like). The UBA cloud server establishes a user behavior model according to the user Internet access information. When a user accesses a content provider webpage or a service provider webpage, the router queries the UBA cloud server for an access interest of the user by using an advertising platform. The advertising platform finds a corresponding advertisement according to the interest, and the advertising platform instructs a web proxy to add the corresponding advertisement to the webpage content that is accessed by the user, so as to implement a precise advertisement push service.

The following is an exemplary specific application scenario.

S01: A user A accesses http://www.tingroom.com/radio/1334.html.

Internet access information of the user A is collected by a UBA subnode A3, where the Internet access information of the user A that is collected by the UBA subnode A3 includes but is not limited to:

user-a, http://www.tingroom.com/radio/1334.html, and
2012-3-10 9:30:00, Mozilla/4.0, and www.tingroom.com.

S02: The UBA subnode A3 cannot find a matched behavior record in a local behavior knowledge base according to http://www.tingroom.com/radio/1334.html.

The UBA subnode A3 reports information to a UBA cloud, where the information reported includes but is not limited to:

http://www.tingroom.com/radio/1334.html, and
2012-3-10 9:30:00, Mozilla/4.0, and www.tingroom.com.

S03: After receiving the information reported by the UBA subnode A3, a UBA cloud server
queries, according to http://www.tingroom.com/radio/1334.html, whether there is a matched behavior record in the behavior knowledge base at the cloud end, and if a matched behavior record is found, performs step S04; and if no matched behavior record is found, performs step S08.

S04: The UBA cloud server sends a webpage acquiring request to the Internet according to http://www.tingroom.com/radio/1334.html.

S05: The Internet returns a corresponding webpage to the UBA cloud server.

S06: The UBA cloud server extracts the following key information from the acquired webpage, where the key information includes but is not limited to: BBC, English, and the like.

The UBA cloud server generates a behavior record according to the key information, and adds the behavior record to the behavior knowledge base:

The behavior records, for example, http://www.tingroom.com/radio/1334.html, English study, BBC, and English.

S07: The UBA cloud delivers the generated behavior record to the UBA subnode A3 and a UBA subnode A4.

The UBA subnode A3 and the UBA subnode A4 update their local behavior knowledge bases according to the generated behavior record.

S08: A user B accesses http://www.tingroom.com/radio/1334.html.

Internet access information of the user B is collected by the UBA subnode A4, where the Internet access information of the user B that is collected by the UBA subnode A4 includes but is not limited to:

user-a, http://www.tingroom.com/radio/1334.html, and
2012-3-10 9:35:00, Mozilla/4.0, and www.tingroom.com.

S09: The UBA subnode A4 finds a matched behavior record in the local behavior knowledge base according to http://www.tingroom.com/radio/1334.html:

The behavior records, for example, http://www.tingroom.com/radio/1334.html, English study, BBC, and English.

The UBA subnode A4 generates an Internet access log record of the user B:

user-b, http://www.tingroom.com/radio/1334.html, 2012-3-10 9:35:00, Mozilla/4.0, www.tingroom.com, English study, BBC, and English.

S11: Each UBA subnode associated with the UBA cloud server models local user behaviors at regular time.

It is assumed that the user A accesses sample webpages for 100 times, and accesses sports NBA webpages discontinuously for less than 10 times; and it is assumed that the user B accesses sample webpages for 100 times, and accesses news webpages discontinuously for less than 10 times.

Then, a behavior modeling result of the user A by the UBA subnode A3 may be:

| User name | Category of long-term interest | Short-term interest |
|---|---|---|
| User-a | English study | NBA |
| . . . | . . . | . . . |

A TOP 2 report of the user A generated by the UBA subnode A3 may be:

| Website | Category | Application name | Number of monthly accesses |
|---|---|---|---|
| www.tingroom.com | English study | tingroom online English study | 30,000 |
| http://www.nikestore.com.cn/ | Sports shoes | China Nike official store | 100 |
| . . . | . . . | . . . | . . . |

A behavior modeling result of the user B by the UBA subnode A4 may be:

| User name | Category of long-term interest | Short-term interest |
|---|---|---|
| User-b | English study | News |
| . . . | . . . | . . . |

A TOP 2 report of the user B generated by the UBA subnode A4 may be:

| Website | Category | Application name | Number of monthly accesses |
|---|---|---|---|
| www.tingroom.com | English study | tingroom online English study | 20,000 |
| http://news.baidu.com/ | News portal | Baidu News | 50 |
| ... | ... | ... | ... |

S12: The UBA cloud server collects information from each UBA subnode regularly or irregularly, where the collected information includes but is not limited to: a user interest table, a TOP2 report, and the like.

S14: The UBA cloud server performs network-wide modeling.

A result of the network-wide modeling by the UBA cloud server may be:

| User name | Category of long-term interest | Short-term interest |
|---|---|---|
| User-b | English study | News |
| User-a | English study | Nike |
| ... | ... | ... |

An Internet access TOP N report aggregated by the UBA cloud server may be:

| Website | Category | Application name | Number of monthly accesses |
|---|---|---|---|
| www.tingroom.com | English study | tingroom online English study | 50,000 |
| http://www.baidu.com.cn/ | News portal | Baidu News | 100 |
| http://www.nikestore.com.cn/ | Sports shoes | China Nike official store | 50 |
| ... | ... | ... | ... |

Subsequently, the advertising platform may query the UBA cloud server for an access interest of the user, the advertising platform finds a corresponding advertisement according to the interest, and the advertising platform may instruct the web proxy to add the corresponding advertisement to the webpage content that is accessed by the user, so as to implement the precise advertisement push service.

It is understandable that the foregoing examples are merely intended to explain the idea of the solutions of the embodiments of the present application, which may be flexibly changed based on a need in different application scenarios, and the present application is not limited to forms of the foregoing examples.

As can be seen from the foregoing, in this embodiment, a UBA subnode deployed under a UBA cloud may collect user Internet access information, extract key Internet access information from the collected user Internet access information, match the key Internet access information with a record in a local behavior knowledge base, and if the matching fails, report a network content identifier in the key Internet access information to a UBA cloud server. This lays a foundation for the UBA cloud server to analyze and recognize the network content identifier that is unrecognizable by the UBA subnode. Because a UBA cloud server that uses a cloud technology has a better analysis and processing capability than a UBA subnode, where the UBA cloud server is at an analysis and decision making layer of a network in which the UBA cloud server is located, and the UBA subnode is at a probe layer of the network in which the UBA cloud server is located, using the UBA cloud server to analyze and recognize a network content identifier that is unrecognizable by the UBA subnode helps improving a user behavior analysis capability of a UBA system. In addition, after performing analysis and recognition once, the UBA cloud server may further deliver a behavior knowledge base updated accordingly by the UBA cloud server, or updated content of the behavior knowledge base to multiple UBA subnodes, so that all UBA subnodes can update their local behavior knowledge bases accordingly, which helps avoiding the problem of repeated analysis by the UBA subnodes on, for example, new network content, so as to improve timeliness of user behavior analysis and reduce resource consumption. Further, using the UBA cloud server helps supporting a processing capability for a complicated scenario, and using the UBA subnode implements high performance of an access end device; and using a cloud computation manner helps supporting lossless upgrade of a service and ensures continuity of the service.

It should be noted that, for brevity, the foregoing method embodiments are represented as a series of actions, but a person skilled in the art should know that the present application is not limited to the described order of actions, because, according to the present application, some steps may be performed in other order or simultaneously. A person skilled in the art should also know that the embodiments described in this specification are all exemplary embodiments, and the involved actions and modules are not necessarily required by the present application.

To better implement the foregoing solutions of the embodiments of the present application, the following further provides related apparatuses for implementing the foregoing solutions.

Figure 12A:
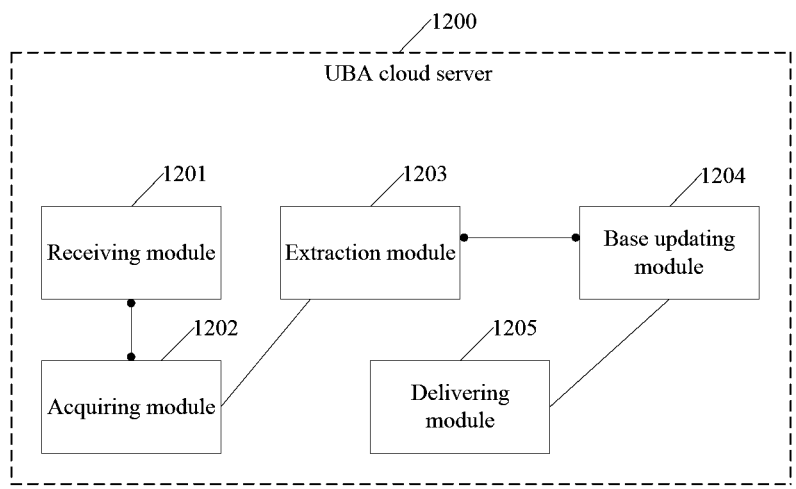
FIG. 12A is a simplified block diagram of another UBA cloud server according to an embodiment of the present application.

Referring to FIG. 12A, a UBA cloud server 1200 provided in an embodiment of the present application may include:

a receiving module 1201, an acquiring module 1202, an extraction module 1203, a base updating module 1204 and a delivering module 1205.

The receiving module 1201 is configured to receive a network content identifier reported by a first UBA subnode, where the network content identifier cannot be identified by the first UBA subnode.

The acquiring module 1202 is configured to acquire network content corresponding to the network content identifier received by the receiving module 1201.

The extraction module 1203 is configured to extract a keyword from the network content acquired by the acquiring module 1202.

It is understandable that the extracting, by the extraction module 1203, a keyword from the network content may be directly extracting all keywords from the network content (that is, all the keywords are included in the network content), and may also be obtaining the keyword by converting information that is extracted from the network content (that is, not all keywords are directly included in the network content, and a part of or all keywords are obtained by converting the information that is extracted from the network content).

In some embodiments of the present application, the extraction module 1203 may extract the keyword from the network content in the following exemplary manner. For example, the extraction module 1203 performs de-noising processing on the network content (certainly, the step may also be omitted); performs word segmentation processing on the network content after the de-noising processing, to obtain multiple words; and extracts a keyword from the plurality of words according to a keyword reference parameter, where the keyword reference parameter, for example, may include: the part of a word, a frequency of a word, a weight of a word, and a position of a word (the position of a word may refer to a position of the word in a sentence, and may also refer to a position of the word in a whole page), and certainly may also include other keyword reference parameters such as a relevant custom word library. Certainly, the extraction module 1203 may also extract the keyword from the network content based on another existing keyword extraction technology.

The base updating module 1204 is configured to update a behavior knowledge base by using the keyword extracted by the extraction module 1203.

The delivering module 1205 is configured to deliver the updated behavior knowledge base or updated content of the behavior knowledge base to a UBA subnode set, where the UBA subnode set at least includes a second UBA subnode and the first UBA subnode. The UBA cloud server 1200 is at an analysis and decision making layer of a network in which the UBA cloud server 1200 is located, and the second UBA subnode and the first UBA subnode are at a probe layer of a network in which the second UBA subnode and the first UBA subnode are located.

For example, in a mobile telecommunication network, the UBA cloud server 1200 may be at a core layer of a network (here the core layer is regarded as the analysis and decision making layer), whereas the UBA subnodes may be at an access layer of the network in which the UBA cloud server is located (here the access layer is regarded as the probe layer); or in a telecommunication operation network, the UBA cloud server 1200 may be at a convergence layer of a network in which the UBA cloud server 1200 is located (here the convergence layer is regarded as the analysis and decision making layer), whereas the UBA subnodes may be in an edge network of the network in which the UBA cloud server is located (here the edge network is regarded as the probe layer); or in an SP/CP network, the UBA cloud server 1200 may be in a core Internet data center of a network in which the UBA cloud server 1200 is located (here the core Internet data center IDC is regarded as the analysis and decision making layer), whereas the UBA subnodes may be in a regional IDC of the network in which the UBA cloud server is located (here the regional IDC is regarded as the probe layer). For other types of networks, situations may be deduced by analogy.

Figure 12B:
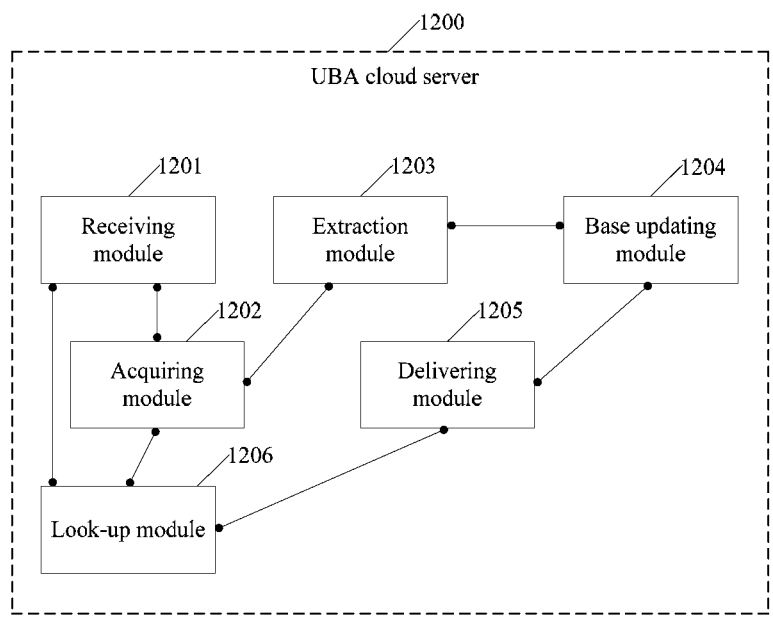
FIG. 12B is a simplified block diagram of another UBA cloud server according to an embodiment of the present application.

Referring to FIG. 12B, in some embodiments of the present application, the UBA cloud server 1200 may further include:

a look-up module 1206, configured to look up, in the behavior knowledge base, a behavior record matching the network content identifier by using the network content identifier received by the receiving module 1201, where:

the delivering module 1205 may be further configured to: if the look-up module 1206 finds a behavior record matching the network content identifier in the behavior knowledge base, deliver content categorization information that is corresponding to the network content identifier and included in the behavior record matching the network content identifier to the first UBA subnode; and the acquiring module 1202 is specifically configured to: if the look-up module 1206 finds no behavior record matching the network content identifier in the behavior knowledge base, acquire the network content corresponding to the network content identifier.

Figure 12C:
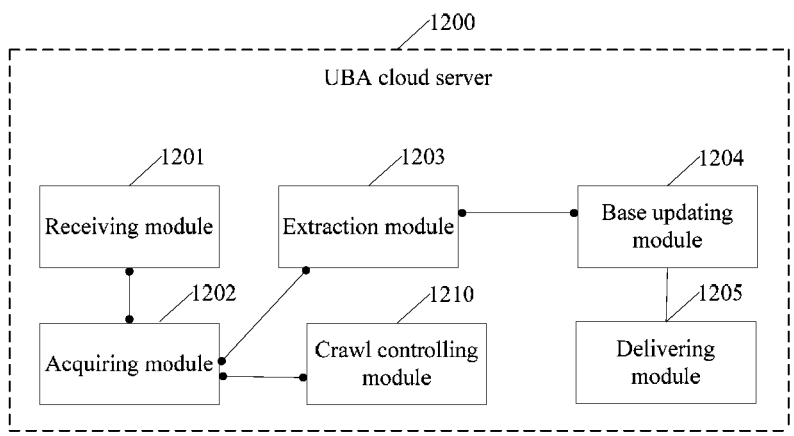
FIG. 12C is a simplified block diagram of another UBA cloud server according to an embodiment of the present application.

Referring to FIG. 12C, in some embodiments of the present application, the UBA cloud server 1200 may further include:

a crawl controlling module 1210, configured to determine whether a current crawl depth for the network content corresponding to the network content identifier exceeds a set upper limit of crawl depth, and if the current crawl depth for the network content exceeds the set upper limit of crawl depth, stop crawling subnet content corresponding to a subnet content identifier that is included in the network content corresponding to the network content identifier; and if the crawl depth for the network content does not exceed the set upper limit of crawl dept, control the acquiring module 1202 to further crawl the subnet content corresponding to the subnet content identifier that is included in the network content corresponding to the network content identifier, where:

the acquiring module 1202 is further configured to crawl the network content corresponding to the subnet content identifier that is included in the network content corresponding to the network content identifier;

the extraction module 1203 is further configured to extract a keyword from the network content obtained by crawling by the acquiring module 1202 and corresponding to the subnet content identifier;

the base updating module 1204 is further configured to update the behavior knowledge base by using the keyword extracted by the extraction module 1203; and the delivering module 1205 is further configured to deliver the updated behavior knowledge base or updated content of the behavior knowledge base to the UBA subnode set.

It is understandable that the UBA cloud server 1200 according to the embodiment may be the UBA cloud server described in the foregoing method embodiments, where functions of the functional modules thereof may be specifically implemented according to the methods in the foregoing method embodiments. For a specific implementation process thereof, reference may be made to related descriptions in the foregoing method embodiments, and details are not described herein again.

Figure 13:
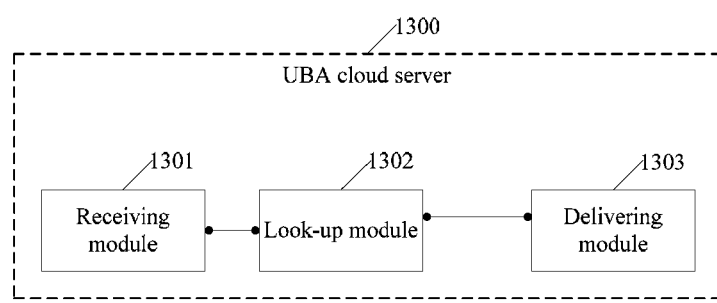
FIG. 13 is a simplified block diagram of another UBA cloud server according to an embodiment of the present application.

Referring to FIG. 13, a UBA cloud server 1300 provided in an embodiment of the present application may include:

a receiving module 1301, configured to receive a network content identifier reported by a first UBA subnode, where the network content identifier cannot be identified by the first UBA subnode;

a look-up module 1302, configured to look up a behavior record matching the network content identifier in a behavior knowledge base by using the network content identifier received by the receiving module 1301; and a delivering module 1303, configured to: if the look-up module 1302 finds the behavior record matching the network content identifier in the behavior knowledge base, deliver, to the first UBA subnode, content categorization information that is included in the behavior record matching the network content identifier and that is corresponding to the network content identifier, where the UBA cloud server 1300 is at an analysis and decision making layer of a network in which the UBA cloud server is located, and the first UBA subnode is at a probe layer of the network in which the UBA cloud server is located.

For example, in a mobile telecommunication network, the UBA cloud server 1300 may be at a core layer of a network in which the UBA cloud server 1300 is located (here the core layer is regarded as the analysis and decision making layer), whereas the UBA subnodes may be at an access layer of the network in which the UBA cloud server is located (here the access layer is regarded as the probe layer); or in a telecommunication operation network, the UBA cloud server 1300 may be at a convergence layer of a network in which the UBA cloud server 1300 is located (here the convergence layer is regarded as the analysis and decision making layer), whereas the UBA subnodes may be in an edge network of the network in which the UBA cloud server is located (here the edge network is regarded as the probe layer); or in an SP/CP network, the UBA cloud server 1300 may be in a core Internet data center of a network in which the UBA cloud server 1300 is located (here the core Internet data center (IDC) is regarded as the analysis and decision making layer), whereas the UBA subnodes may be in a regional IDC of the network in which the UBA cloud server is located (here the regional IDC is regarded as the probe layer). For other types of networks, situations may be deduced by analogy.

It is understandable that the UBA cloud server 1300 according to the embodiment may be the UBA cloud server described in the foregoing method embodiments, where functions of the functional modules thereof may be specifically implemented according to the methods in the foregoing method embodiments. For a specific implementation process thereof, reference may be made to related descriptions in the foregoing method embodiments, and details are not described herein again.

Figure 14A:
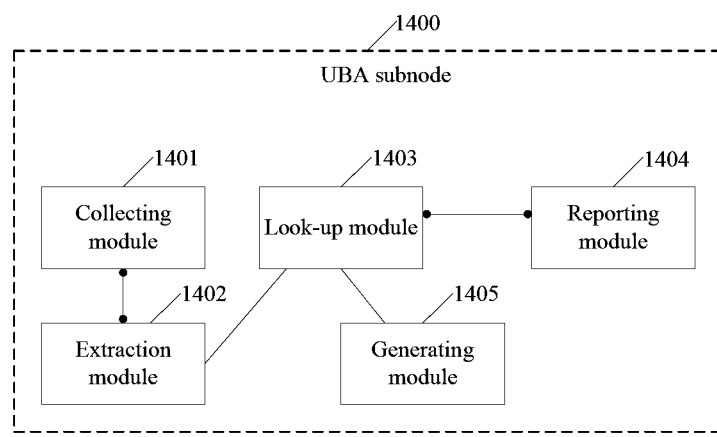
FIG. 14A is a simplified block diagram of another UBA subnode according to an embodiment of the present application.

Referring to FIG. 14A, a UBA subnode 1400 provided in an embodiment of the present application may include a collecting module 1401, an extraction module 1402, a look-up module 1403, a reporting module 1404 and a generating module 1405.

The collecting module 1401 is configured to collect user Internet access information.

The extraction module 1402 is configured to extract key Internet access information from the user Internet access information collected by the collecting module 1401, where the key Internet access information includes a network content identifier.

It is understandable that the extracting, by the extraction module 1402, key Internet access information from the user Internet access information may be directly extracting all key Internet access information from the user Internet access information (that is, the user Internet access information includes all key Internet access information), and may also be obtaining the key Internet access information by converting information extracted from the user Internet access information (that is, all key Internet access information is not directly included in network content, and a part of or all key Internet access information is obtained by converting the information extracted from the network content).

The look-up module 1403 is configured to look up a behavior record matching the key Internet access information in a local behavior knowledge base by using the key Internet access information extracted by the extraction module 1402.

The reporting module 1404 is configured to: if the look-up module 1403 finds no behavior record matching the key Internet access information in the local behavior knowledge base, report the network content identifier in the key Internet access information to a UBA cloud server, where the UBA cloud server is at an analysis and decision making layer of a network in which the UBA cloud server is located, and the first UBA subnode 1400 is at a probe layer of the network in which the UBA cloud server is located.

For example, in a mobile telecommunication network, the UBA cloud server may be at a core layer of a network in which the UBA cloud server is located (here the core layer is regarded as the analysis and decision making layer), whereas the UBA subnode 1400 may be at an access layer of the network in which the UBA cloud server is located (here the access layer is regarded as the probe layer); or in a telecommunications operation network, the UBA cloud server may be at a convergence layer of a network in which the UBA cloud server is located (here the convergence layer is regarded as the analysis and decision making layer), whereas the UBA subnode 1400 may be in an edge network of the network in which the UBA cloud server is located (here the edge network is regarded as the probe layer); or in an SP/CP network, the UBA cloud server may be in a core Internet data center of a network in which the UBA cloud server is located (here the core IDC is regarded as the analysis and decision making layer), whereas the UBA subnode 1400 may be in a regional IDC of the network in which the UBA cloud server is located (here the regional IDC is regarded as the probe layer). For other types of networks, situations may be deduced by analogy.

The generating module 1405 is configured to: if the look-up module 1403 finds a matched behavior record in a local behavior knowledge base 1408, generate a user access log according to the matched behavior record, and perform user behavior modeling according to the generated user access log.

Figure 14B:
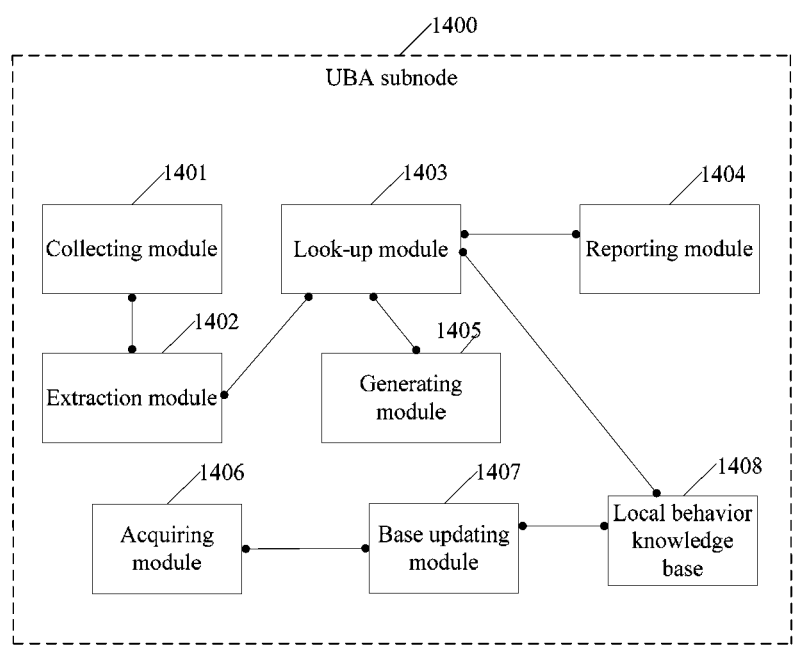
FIG. 14B is a simplified block diagram of another UBA subnode according to an embodiment of the present application.

Referring to FIG. 14B, in some embodiments of the present application, the UBA subnode 1400 may further include:

an acquiring module 1406, configured to receive a behavior knowledge base, updated content of a behavior knowledge base, or content categorization information corresponding to the network content identifier, which is delivered by the UBA cloud server;

a base updating module 1407, configured to update a local behavior knowledge base 1408 of the UBA subnode 1400 by using the behavior knowledge base, the updated content of the behavior knowledge base, or the content categorization information corresponding to the network content identifier, which is delivered by the UBA cloud server; and the local behavior knowledge base 1408, configured to store multiple behavior records, where an example of a behavior record in the local behavior knowledge base 1408 of the UBA subnode 1400 is shown in Table 7 (same as Table 2).

TABLE 7

| Field | Meaning |
|---|---|
| Network ID | Uniquely identifies one piece of network content, may be obtained through Hash calculation by using a URL, and the network ID is used for fast querying. |
| Network content identifier | A uniform identifier that uniquely identifies one piece of network content, that is, a URL |
| Website name | A network SP/CP to which content corresponding to the network ID belongs, for example, Sina web portal |

TABLE 7-continued

| Field | Meaning |
| --- | --- |
| Application name | An application name corresponding to the network ID, for example, sina weibo |
| Content category | A content category corresponding to the network ID, for example, news |
| Title | A title of content corresponding to the network ID |
| Keyword | A subject keyword of content corresponding to the network ID, for example, in an article that introduces a mobile phone, mobile phone may be its keyword |
| ... | ... |

Certainly, behavior records recorded in the local behavior knowledge base 1408 are not limited to the forms of Table 7.

It is understandable that the UBA subnode 1400 according to the embodiment may be the UBA subnode described in the foregoing method embodiments, where functions of the functional modules thereof may be specifically implemented according to the methods in the foregoing method embodiments. For a specific implementation process thereof, reference may be made to related descriptions in the foregoing method embodiments, and details are not described herein again.

Figure 15:
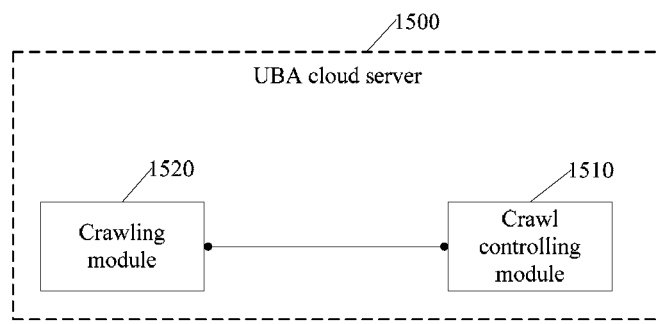
FIG. 15 is a simplified block diagram of another UBA cloud server according to an embodiment of the present application.

Referring to FIG. 15, an embodiment of the present application further provides a UBA cloud server 1500, which may include:

a crawl controlling module 1510 and a crawling module 1520.

The crawling module 1520 is configured to crawl network content corresponding to a network content identifier.

The crawl controlling module 1510 is configured to determine whether a current crawl depth for the network content corresponding to the network content identifier exceeds a set upper limit of crawl depth, and if the current crawl depth for the network content exceeds the set upper limit of crawl depth, stop crawling a subnet content corresponding to a subnet content identifier that is included in the network content corresponding to the network content identifier; and if the crawl depth for the network content does not exceed the set upper limit of crawl dept, control the crawling module 1520 to further crawl the a subnet content corresponding to the subnet content identifier that is included in the network content corresponding to the network content identifier.

The crawling module 1520 is further configured to crawl the network content corresponding to the subnet content identifier that is included in the network content corresponding to the network content identifier.

It is understandable that the UBA cloud server 1500 according to the embodiment may be the UBA cloud server described in the foregoing method embodiment, where functions of the functional modules thereof may be specifically implemented according to the methods in the foregoing method embodiments. For a specific implementation process thereof, reference may be made to related descriptions in the foregoing method embodiments, and details are not described herein again.

Figure 16:
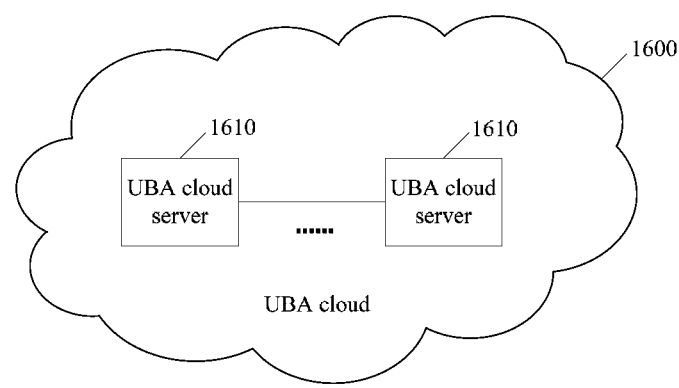
FIG. 16 is a schematic diagram of a UBA cloud according to an embodiment of the present application.

Referring to FIG. 16, an embodiment of the present application further provides a UBA cloud 1600, including:

one or more UBA cloud servers 1610 (where in FIG. 16, for example, multiple UBA cloud servers 1610 are included), where the UBA cloud servers 1610 are at an analysis and decision making layer of a network in which the UBA cloud servers 1610 are located.

For example, the UBA cloud server 1610 may have a part of or all functions of the UBA cloud server 1200, the UBA cloud server 1300 or the UBA cloud server 1500 in the foregoing embodiments.

Figure 17:
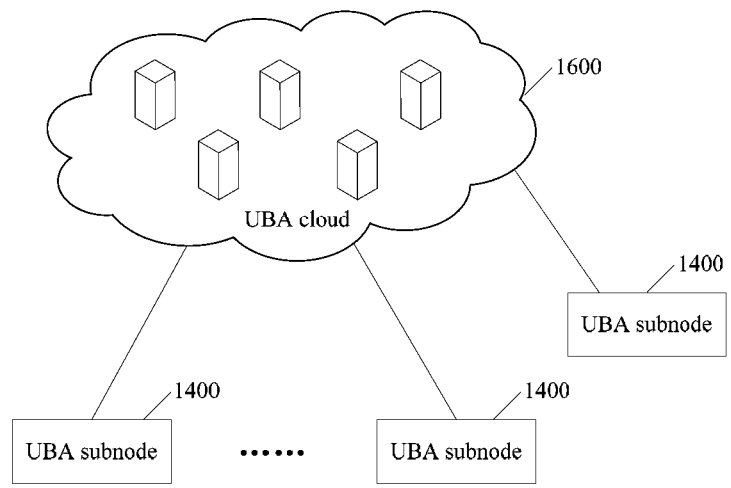
FIG. 17 is a schematic diagram of a UBA system according to an embodiment of the present application.

Referring to FIG. 17, an embodiment of the present application further provides a user behavior analysis system, which may include:

a UBA cloud 1600 and at least one UBA subnode 1400.

A UBA cloud server in the UBA cloud 1600 and the UBA subnode 1400 are connected in a communicable manner.

In the foregoing embodiments, the embodiments are described with different emphases, and for a part not described in detail in one embodiment, reference may be made to relevant descriptions in other embodiments.

In conclusion, in the embodiments of the present application, multiple UBA subnodes is deployed under a UBA cloud, and the UBA cloud includes at least one UBA cloud server, where the UBA cloud server is at an analysis and decision making layer of a network in which the UBA cloud server is located, and the UBA subnodes are at a probe layer of the network in which the UBA cloud server is located. When the UBA cloud server receives a network content identifier reported by a first UBA subnode, where the network content identifier cannot be identified by the first UBA subnode, the UBA cloud server acquires network content corresponding to the network content identifier; extracts a keyword from the network content; updates a behavior knowledge base by using the extracted keyword; and delivers the updated behavior knowledge base or update content of the behavior knowledge base to a UBA subnode set, where the UBA subnode set at least includes a second UBA subnode and the first UBA subnode.

Because a UBA cloud that uses a cloud technology has a better analysis and processing capability than a UBA subnode, using a UBA cloud server to analyze and recognize a network content identifier that is unrecognizable by the UBA subnode helps improving a user behavior analysis capability of a UBA system. In addition, after performing analysis and recognition once, the UBA cloud server delivers a UBA cloud behavior knowledge base updated accordingly by the UBA cloud server, or updated content of the UBA cloud behavior knowledge base to a UBA subnode set, so that all UBA subnodes in the UBA subnode set can update their local behavior knowledge bases accordingly, which helps avoiding the problem of repeated analysis by multiple UBA subnodes on, for example, new network content, so as to improve timeliness of user behavior analysis and reduce resource consumption.

A person of ordinary skill in the art may understand that all or a part of the steps of the methods in the embodiments may be implemented by a program instructing relevant hardware. The program may be stored in a computer readable storage medium. The storage medium may include: a read-only memory, a random access memory, a magnetic disk, an optical disc, or the like.

The user behavior analysis method, and the related device and system provided in the embodiments of the present application have been described in detail above, where the principle and implementation manners of the present application are described herein by using specific examples. The descriptions about the foregoing embodiments are merely for ease of understanding of the method and core idea of the present application. In addition, a person of ordinary skill in the art may make variations to the specific implementation manners and application scope of the present application according to the idea of the present application. Therefore, the specification shall not be construed as a limit to the present application.

What is claimed is:

1. A user behavior analysis (UBA) method for use in a UBA system associated with a communication network, wherein the UBA system comprises a UBA cloud server, a first UBA subnode and a second UBA subnode, the UBA cloud server is associated with an analysis and decision making layer of the network, and the first and the second UBA subnodes are associated with a probe layer of the network, wherein the UBA cloud server is disposed external to the first and the second UBA subnodes and the UBA cloud server is able to identify network content unrecognizable by the first and the second UBA subnodes, the method comprising:
receiving, by the UBA cloud server, a network content identifier in key Internet access information extracted by the first UBA subnode from a user's Internet access information, wherein the network content identifier is reported by the first UBA subnode when no behavior record matching the key Internet access information is found in a local behavior knowledge base of the first UBA subnode;
acquiring, by the UBA cloud server, the network content corresponding to the network content identifier;
extracting, by the UBA cloud server, a keyword from the network content;
updating a behavior knowledge base of the UBA cloud server by using the extracted keyword; and
delivering, by the UBA cloud server, the updated behavior knowledge base or updated content of the behavior knowledge base to the first UBA subnode and at least the second UBA subnode, so as to update the local behavior knowledge base of the first UBA subnode and the second UBA subnode.

2. The method according to claim 1, wherein updating the behavior knowledge base by using the extracted keyword comprises:
obtaining, by the UBA cloud server, content categorization information according to the extracted keyword;
generating, by the UBA cloud server based on the content categorization information and the keyword, a behavior record; and
adding, by the UBA cloud server, the generated behavior record to the behavior knowledge base of the UBA cloud server.

3. The method according to claim 1, wherein extracting the keyword from the network content comprises:
performing a de-noising process on the network content;
after the de-noising process is performed, performing a word segmentation process on the network content, to obtain a plurality of words; and
extracting the keyword from the plurality of words according to a keyword reference parameter,
wherein the keyword reference parameter comprises one or more of the following: a property of a word, a word frequency of a word, a weight of a word, and a position of a word.

4. The method according to claim 1, further comprising:
looking up, by the UBA cloud server and in the behavior knowledge base of the UBA cloud server, a behavior record matching the network content identifier by using the network content identifier; and
when no behavior record matching the network content identifier is found in the behavior knowledge base of the UBA cloud server, performing, by the UBA cloud server, the following:
acquiring the network content corresponding to the network content identifier;
extracting the keyword from the network content;
updating the behavior knowledge base of the UBA cloud server by using the extracted keyword; and
delivering the updated behavior knowledge base or updated content of the behavior knowledge base to the first and the second UBA subnodes.

5. The method according to claim 1, wherein comprising:
looking up, by the UBA cloud server and in the behavior knowledge base of the UBA cloud server, a behavior record matching the network content identifier by using the network content identifier; and
when the behavior record matching the network content identifier is found in the behavior knowledge base of the UBA cloud server, delivering, by the UBA cloud server to the first UBA subnode, content categorization information that is corresponding to the network content identifier and that is included in the behavior record matching the network content identifier.

6. The method according to claim 1, further comprising:
acquiring, by the UBA cloud server, user behavior analysis reports or Internet behavior analysis reports generated by the UBA subnode set; and
aggregating the acquired user behavior analysis reports or Internet behavior analysis reports, to obtain an aggregated user behavior analysis report or an aggregated Internet behavior analysis report.

7. The method according to claim 1, wherein acquiring the network content corresponding to the network content identifier comprises:
crawling the network content corresponding to the network content identifier; and wherein after the crawling the network content corresponding to the network content identifier, the method further comprises:
determining, by the UBA cloud server, whether a current crawl depth for the network content corresponding to the network content identifier exceeds a set upper limit of crawl depth;
when the current crawl depth for the network content exceeds the set upper limit of crawl depth, terminating, by the UBA cloud server, crawling network content corresponding to a subnet content identifier that is included in the network content corresponding to the network content identifier; and
when the crawl depth for the network content does not exceed the set upper limit of crawl depth, further crawling, by the UBA cloud server, the network content corresponding to the subnet content identifier that is included in the network content corresponding to the network content identifier,
extracting a keyword from the network content that is obtained by crawling and that is corresponding to the subnet content identifier included in the network content corresponding to the network content identifier;
updating the behavior knowledge base of the UBA cloud server by using the extracted keyword; and
delivering the updated behavior knowledge base or updated content of the behavior knowledge base to the first and the second UBA subnodes.

8. The method according to claim 1, wherein:
the communication network is a mobile telecommunication network, and the UBA cloud server is associated with a core layer of the mobile telecommunication network, and the first and second UBA subnodes are associated with an access layer of the mobile telecommunication network.

9. A user behavior analysis (UBA) method for use in a UBA system associated with a communication network, wherein the UBA system comprises a UBA cloud server, a first UBA subnode and a second UBA subnode, the UBA cloud server is associated with an analysis and decision making layer of the network, and the first and the second UBA subnodes are associated with a probe layer of the network, wherein the UBA cloud server is disposed external to the first and the second UBA subnodes and the UBA cloud server is able to identify network content unrecognizable by the first and the second UBA subnodes, the method comprising:
 collecting, by the first UBA subnode, user Internet access information;
 extracting, by the first UBA subnode, key Internet access information from the collected user Internet access information, wherein the key Internet access information comprises a network content identifier;
 looking up, by the first UBA subnode and in a local behavior knowledge base, a behavior record matching the key Internet access information by using the key Internet access information; and
 when no behavior record matching the key Internet access information is found in the local behavior knowledge base, reporting, by the first UBA subnode, the network content identifier in the key Internet access information to the UBA cloud server; and
 when the behavior record matching the key Internet access information is found in the local behavior knowledge base, generating, by the first UBA subnode, a user access log according to the behavior record matching the key Internet access information, and
 performing user behavior modeling according to the generated user access log.

10. The method according to claim 9, wherein when no behavior record matching the key Internet access information is found in the local behavior knowledge base, and after reporting the network content identifier in the key Internet access information to the UBA cloud server, the method further comprises:
 receiving, by the first UBA subnode, a behavior knowledge base, updated content of a behavior knowledge base or content categorization information corresponding to the network content identifier from the UBA cloud server; and
 updating, by the first UBA subnode, the local behavior knowledge base of the first UBA subnode by using the behavior knowledge base, the updated content of the behavior knowledge base, or the content categorization information corresponding to the network content identifier.

11. A user behavior analysis (UBA) cloud server, comprising:
 a memory; and
 a processor coupled with the memory, configured to:
 receive a network content identifier in key Internet access information extracted by a first UBA subnode from a user's Internet access information, wherein the network content identifier is reported by the first UBA subnode when no behavior record matching the key Internet access information is found in a local behavior knowledge base of the first UBA subnode; wherein the UBA cloud server is disposed external to the first UBA subnode and the UBA cloud server is able to identify network content unrecognizable by the first UBA subnode;
 acquire the network content corresponding to the network content identifier;
 extract a keyword from the network content;
 update a behavior knowledge base of the UBA cloud server by using the extracted keyword; and
 deliver the updated behavior knowledge base or updated content of the behavior knowledge base to a UBA subnode set,
 wherein the UBA subnode set comprises the first UBA subnode and at least a second UBA subnode,
 wherein the UBA cloud server is associated with an analysis and decision making layer of a communication network, the first UBA subnode and the second UBA subnode are associated with a probe layer of the communication network.

12. The UBA cloud server according to claim 11, wherein the processor is further configured to:
 look up, in the behavior knowledge base of the UBA cloud server, a behavior record matching the network content identifier by using the network content identifier received from the first UBA subnode; and
 when the look-up module finds no behavior record matching the network content identifier in the behavior knowledge base of the UBA cloud server, acquire the network content corresponding to the network content identifier.

13. The UBA cloud server according to claim 11, wherein the processor is further configured to:
 look up, in the behavior knowledge base of the UBA cloud server, a behavior record matching the network content identifier by using the network content identifier received from the first UBA subnode; and
 when the look-up module finds the behavior record matching the network content identifier in the behavior knowledge base of the UBA cloud server, deliver, to the first UBA subnode, content categorization information that is comprised in the behavior record matching the network content identifier and that is corresponding to the network content identifier.

14. The UBA cloud server according to claim 11, wherein the processor is further configured to:
 crawl the network content corresponding to the network content identifier; and
 determine whether a current crawl depth for the network content corresponding to the network content identifier exceeds a set upper limit of crawl depth, and when the current crawl depth for the network content exceeds the set upper limit of crawl depth, stop crawling network content corresponding to a subnet content identifier that is comprised in the network content corresponding to the network content identifier; and when the crawl depth for the network content does not exceed the set upper limit of crawl dept, control the acquiring module to further crawl the network content corresponding to the subnet content identifier that is comprised in the network content corresponding to the network content identifier;
 crawl the network content corresponding to the subnet content identifier that is comprised in the network content corresponding to the network content identifier;
 extract a keyword from the network content obtained by crawling by the acquiring module and corresponding to the subnet content identifier;

update the behavior knowledge base of the UBA cloud server by using the keyword extracted by the extraction module; and deliver the updated behavior knowledge base or updated content of the behavior knowledge base to the UBA subnode set.

15. A user behavior analysis (UBA) subnode, comprising:
a memory; and
a processor coupled with the memory, configured to:
collect user Internet access information;
extract key Internet access information from the user Internet access information collected by the collecting module, wherein the key Internet access information comprises a network content identifier;
look up a behavior record matching the key Internet access information in a local behavior knowledge base by using the key Internet access information extracted by the extraction module;
when the look-up module finds no behavior record matching the key Internet access information in the local behavior knowledge base, report the network content identifier in the key Internet access information to a UBA cloud server; wherein the UBA cloud server is disposed external to the UBA subnode and the UBA cloud server is able to identify network content unrecognizable by the UBA subnode; and
when the look-up module finds the behavior record matching the key Internet access information in the local behavior knowledge base, generate a user access log according to the behavior record matching the key Internet access information, and perform user behavior modeling according to the generated user access log,
wherein the UBA cloud server is associated with an analysis and decision making layer of a communication network, and the UBA subnode is associated with a probe layer of the communication network.

16. The UBA subnode according to claim 15, wherein the processor is further configured to:
receive a behavior knowledge base, updated content of a behavior knowledge base, or content categorization information corresponding to the network content identifier from the UBA cloud server; and
update a local behavior knowledge base of the UBA subnode by using the behavior knowledge base, the updated content of the behavior knowledge base, or the content categorization information corresponding to the network content identifier.

17. The method according to claim 1, wherein:
the communication network is a telecommunication operation network, and the UBA cloud server is associated with a convergence layer of the telecommunication operation network, and the UBA subnodes are associated with an edge network of the telecommunication operation network.

18. The method according to claim 1, wherein:
the communication network is a service provider/content provider (SP/CP) network, and the UBA cloud server is associated with a core Internet data center (IDC) of the SP/SC network, and the UBA subnodes are associated with a regional IDC of the SP/SC network.

* * * * *